(12) United States Patent
Lee et al.

(10) Patent No.: US 10,735,054 B2
(45) Date of Patent: Aug. 4, 2020

(54) WIRELESS COMMUNICATION DEVICE AND METHOD FOR TRANSFERRING COMMUNICATION RIGHTS BETWEEN ELECTRONIC DEVICES

(71) Applicant: Samsung Electronics Co., Ltd., Gyeonggi-do (KR)

(72) Inventors: Byoung-Chul Lee, Gyeonggi-do (KR); Hyeonggeun Kim, Gyeonggi-do (KR); Donghyoun Son, Gyeonggi-do (KR); Jae-Hyun Jo, Gyeonggi-do (KR); Sang-Hyeok Sim, Gyeonggi-do (KR); Donghoon Hyun, Gyeonggi-do (KR); Ilsung Hong, Seoul (KR); Seung-Nyun Kim, Incheon (KR); Yong Sang Yun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/132,690

(22) Filed: Sep. 17, 2018

(65) Prior Publication Data
US 2019/0103899 A1    Apr. 4, 2019

(30) Foreign Application Priority Data

Sep. 29, 2017 (KR) .................. 10-2017-0128017

(51) Int. Cl.
*H04B 5/06* (2006.01)
*G06F 1/16* (2006.01)
(Continued)

(52) U.S. Cl.
CPC .............. *H04B 5/06* (2013.01); *G06F 1/1605* (2013.01); *G06F 1/1698* (2013.01); *G06F 3/165* (2013.01); *G06F 3/167* (2013.01); *H04W 4/80* (2018.02)

(58) Field of Classification Search
CPC ....... H04W 4/80; H04W 76/14; H04W 84/20; H04W 88/02; G06F 1/1605; G06F 1/1698; G06F 3/167; H04B 5/06
See application file for complete search history.

(56) References Cited

U.S. PATENT DOCUMENTS 9,769,858 B2 *  9/2017 Seymour .............. H04M 1/7253
9,838,829 B2 * 12/2017 El-Hoiydi ............ H04R 25/556
(Continued)

FOREIGN PATENT DOCUMENTS

KR    10-2016-0075060 A    6/2016

OTHER PUBLICATIONS

International Search Report dated Jan. 3, 2019.

*Primary Examiner* — Devan A Sandiford
(74) *Attorney, Agent, or Firm* — Cha & Reiter, LLC.

(57) ABSTRACT

According to various embodiments, an electronic device comprises a short range communication circuit; and a processor, wherein the processor is configured to: establish a communication channel with a first external electronic device by using a designated communication scheme, through the short range communication circuit; transmit information related to the communication channel to a second external electronic device through the short range communication circuit; receive a request to transfer communication rights with the first external device to the second external device; and transfer communication rights with the first external device from the electronic device to the second external electronic device.

19 Claims, 19 Drawing Sheets

(51) Int. Cl.
*G06F 3/16* (2006.01)
*H04W 4/80* (2018.01)

(56) References Cited

U.S. PATENT DOCUMENTS

| | | | |
|---|---|---|---|
| 9,924,010 B2* | 3/2018 | Watson | H04M 1/6066 |
| 10,149,067 B2 | 12/2018 | Kim et al. | |
| 10,212,569 B1* | 2/2019 | Huang | H04W 88/16 |
| 2002/0068610 A1* | 6/2002 | Anvekar | H04M 1/6066 |
| | | | 455/560 |
| 2003/0223604 A1* | 12/2003 | Nakagawa | H04M 1/6066 |
| | | | 381/311 |
| 2007/0198419 A1* | 8/2007 | Park | H04L 63/0428 |
| | | | 705/52 |
| 2009/0238375 A1* | 9/2009 | Pilati | H04L 1/004 |
| | | | 381/79 |
| 2010/0208922 A1* | 8/2010 | Erni | H04R 25/554 |
| | | | 381/315 |
| 2010/0232618 A1* | 9/2010 | Haartsen | H04L 1/0003 |
| | | | 381/80 |
| 2012/0058727 A1 | 3/2012 | Cook et al. | |
| 2013/0311692 A1* | 11/2013 | Huang | H04M 1/723 |
| | | | 710/303 |
| 2015/0056919 A1 | 2/2015 | Fyke | |
| 2015/0334488 A1* | 11/2015 | Kim | H04W 4/06 |
| | | | 381/2 |
| 2015/0351143 A1* | 12/2015 | Seymour | H04M 1/72519 |
| | | | 455/41.2 |
| 2016/0057553 A1 | 2/2016 | Ryu et al. | |
| 2016/0105924 A1 | 4/2016 | Baek et al. | |
| 2016/0277878 A1 | 9/2016 | Lee | |
| 2016/0316051 A1* | 10/2016 | Hsieh | H04M 1/7253 |
| 2018/0084456 A1* | 3/2018 | Gostev | H04R 1/1016 |
| 2018/0084569 A1* | 3/2018 | Li | H04W 72/1263 |
| 2018/0084606 A1* | 3/2018 | Li | H04W 88/04 |
| 2018/0176715 A1* | 6/2018 | Uno | H04W 4/16 |

\* cited by examiner

WIRELESS COMMUNICATION DEVICE AND METHOD FOR TRANSFERRING COMMUNICATION RIGHTS BETWEEN ELECTRONIC DEVICES

CROSS-REFERENCE TO RELATED APPLICATION(S)

This application is based on and claims priority under 35 U.S.C. § 119 to Korean Patent Application No. 10-2017-0128017, filed on Sep. 29, 2017, in the Korean Intellectual Property Office, the disclosure of which is incorporated by reference herein in its entirety.

BACKGROUND

1) Field

Various embodiments of the present disclosure provide a method and a device for communication between each of devices in an environment including a first device and a second device which are capable of communicating with an electronic device.

2) Description of Related Art

The above information is presented as background information only to assist with an understanding of the present disclosure. No determination has been made, and no assertion is made, as to whether any of the above might be applicable as prior art with regard to the present disclosure.

With the development of digital technology, various types of electronic devices, such as a mobile communication terminal, a smart phone, a tablet personal computer (PC), a notebook, a personal digital assistant (PDA), a wearable device, a digital camera, a personal computer, and the like are widely used. An electronic device may communicate with an external electronic device via wireless communication as well as via wired communication. For example, an electronic device may input and/or output, via an external electronic device, an audio signal related to performing a function of the electronic device, by wirelessly connecting with the external electronic device (e.g., a Bluetooth speaker, a Bluetooth earbud, a Bluetooth hands-free earphone, etc.) via Bluetooth communication.

SUMMARY

An external electronic device may include a microphone for receiving the voice of a user. Where the microphone is integrated or otherwise attached to speakers, it may be difficult to dispose the microphone device at an optimal position for a voice input of a user. This can occur because movement of the microphone is restricted, due to the size and shape of the external electronic device and arrangement of devices, such as a speaker device. For example, some earphones include a microphone that is attached where the wires of the individual earpieces are joined, thus positioning the microphone near the user's neck. As a result, in a conventional external electronic device, the quality (e.g., a signal-to-noise ratio (SNR)) of a voice received through a microphone is lowered. This results in reducing the quality of a phone conversation. Additionally, voice recognition may also be less accurate.

The microphone and speaker can be separated when each device is connected to an audio source device (e.g., an electronic device) via Bluetooth communication. This however results in unnecessary usage of resources (e.g., power, frequency bands (due to the use of a plurality of channels), etc.) for maintaining two Bluetooth connections. Additionally, the user is inconvenienced establishing Bluetooth connections with two different external electronic devices.

Various embodiments of the present disclosure provide a method and device for configuring a system by using a device that provides a microphone function and a device that provides a speaker function, in an external electronic device for transmitting an audio signal to or receiving an audio signal from an electronic device.

Various embodiments of the present disclosure provide a method and device for separately operating an external electronic device (e.g., a microphone device) as a separate wireless device, the external electronic device for audio input in an audio input-output device (e.g., a Bluetooth headset, a Bluetooth earbud, a Bluetooth hands-free earphone, etc.) which is wirelessly connected with an electronic device so as to be able to input or output an audio signal.

Various embodiments of the present disclosure provide a method and device for enabling communication for an input signal or an output signal by one communication connection between an electronic device and a plurality of external electronic devices (e.g., a microphone device and a speaker device).

According to various embodiments, an electronic device comprises a short range communication circuit; and a processor, wherein the processor is configured to: establish a communication channel with a first external electronic device by using a designated communication scheme, through the short range communication circuit; transmit information related to the communication channel to a second external electronic device through the short range communication circuit; receive a request to transfer communication rights with the first external device to the second external device; and transfer communication rights with the first external device from the electronic device to the second external electronic device. According to various embodiments, an electronic device comprises a microphone; a short range communication circuit; and a processor, wherein the processor is configured to: receive, from a first external electronic device, through the short range communication circuit, information related to a communication channel connected using a designated communication scheme between the first external electronic device and a second external electronic device; receive a request to receive communication rights for communication with the second external electronic device will be transferred from the first external device to the electronic device; receive communication rights transferred from the first external electronic device to communication with the second external electronic device; acquire an audio signal from the microphone; and transmit the audio signal to the second external electronic device with the communication rights, through the short range communication circuit. According to various embodiments, an electronic device comprises a short range communication circuit; and a processor, wherein the processor is configured to: establish a communication channel with a first external electronic device by using a designated communication scheme, through the short range communication circuit; confirm a request for acquiring an audio signal by using a microphone functionally connected with a second external electronic device; and at least on the basis of the confirmed request, transmit, to the first external electronic device, an instruction to transfer communication rights of the first external electronic device to communicate with the electronic device to the second external electronic device; receiving a voice signal from the second external electronic device. According to various embodiments, an operation method of an electronic device, comprises establishing a first communication channel with a first external electronic device by using a designated communication scheme; transmitting information related to the first communication channel to a second external electronic device through a second communication channel established using a designated communication scheme with the second external electronic device; reproducing an audio signal transmitted from the first external electronic device through the first communication channel; detecting a trigger for transferring communication rights to the second external device by the first external electronic device or the second external electronic device; responsive to detecting the trigger, transferring the communication rights of the electronic device to the second external electronic device through the second communication channel; and changing a mode of the electronic device in response to transferring of the communication rights.

In order to solve the technical problem, various embodiments of the present disclosure may include a computer-readable recording medium having a program recorded therein to perform the method by a processor.

In accordance with an electronic device and an operation method thereof according to various embodiments, transmission or reception of an audio signal is possible through one communication connection between an electronic device and external electronic devices (e.g., a microphone device and a speaker device) in which a microphone device and a speaker device are separated. Therefore, a user can more freely select a wearing position of the microphone device, and a more optimal quality can be provided to the user when using a function such as conversation or voice recognition.

According to various embodiments, a microphone device is provided separately from a speaker device (e.g., a headset, an earbud, etc.) to enable a user to put on the microphone device in a free position. According to various embodiments, depending on a situation (or a scenario) in which a user uses an electronic device and external electronic devices (e.g., listening to music→phone conversation→voice recorder etc.), it is possible to minimize the use and battery consumption of the external electronic devices by seamlessly performing a switch so that only the speaker device or the microphone device is available.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
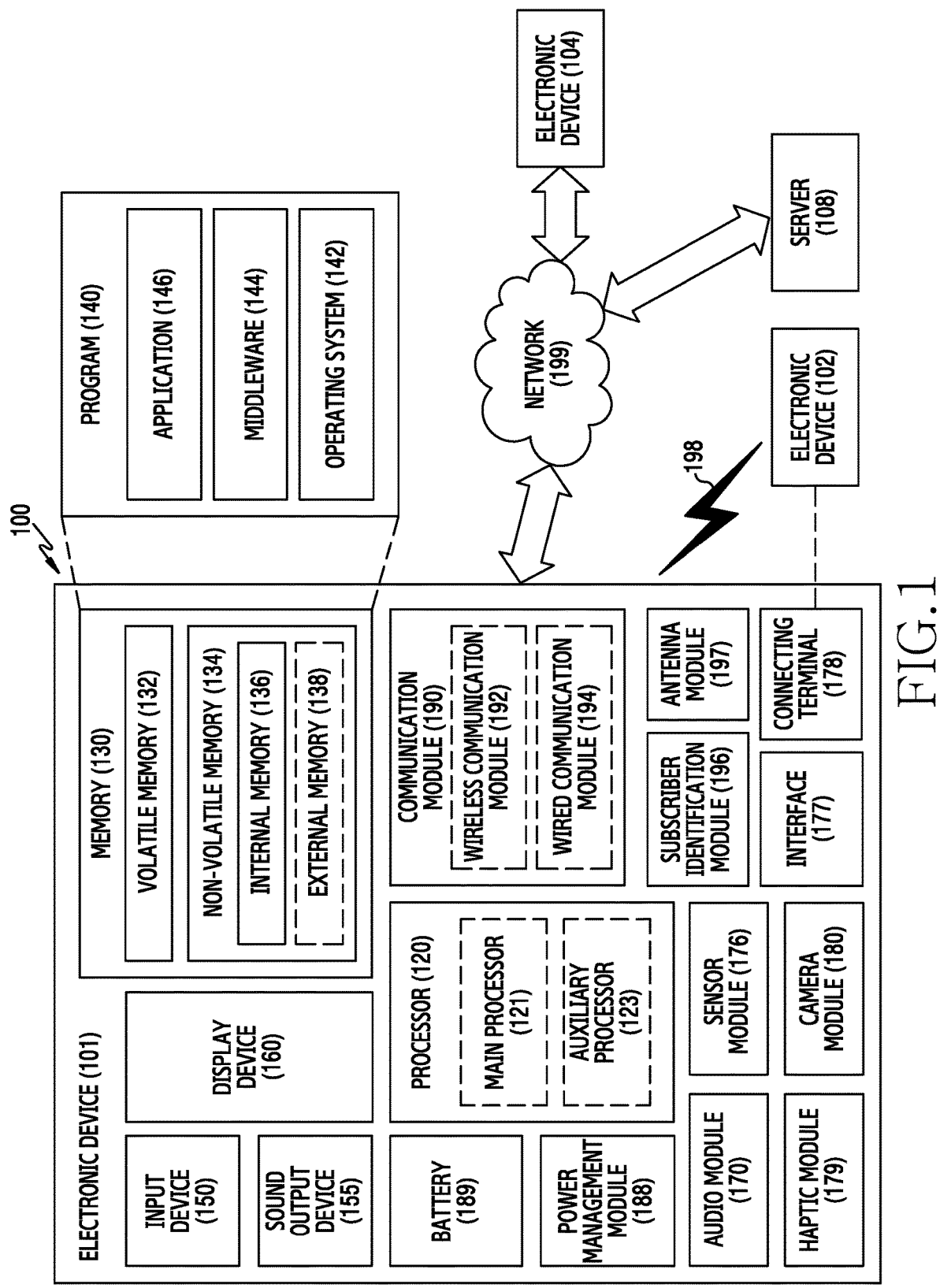
FIG. 1 is a block diagram of an electronic device within a network environment for performing communication between electronic devices according to various embodiments.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In describing the drawings, similar reference numerals may be used to designate similar constituent elements. It should be understood that there is no intent to limit the present disclosure to the particular forms disclosed herein. Instead, the present disclosure should be construed to cover various modifications, equivalents, and/or alternatives of the described embodiments.

FIG. 1 is a block diagram illustrating an electronic device within a network environment for performing communication between electronic devices according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor (e.g., including processing circuitry) 120, memory 130, an input device (e.g., including input circuitry) 150, a sound output device 155, a display device 160, an audio module 170, a sensor module 176, an interface 177, a haptic module 179, a camera module 180, a power management module 188, a battery 189, a communication module (e.g., including communication circuitry) 190, a subscriber identification module (SIM) 196, and/or an antenna module 197.

In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may include various processing circuitry and execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include various processing circuitry, such as, for example, and without limitation, a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may include various processing circuitry and control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include various input circuitry, such as, for example, and without limitation, a microphone, a mouse, and/or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include various interface circuitry, such as, for example, and without limitation, a high definition multimedia interface (HDMI), a universal serial bus (USB) interface, a secure digital (SD) card interface, and/or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include various communication circuitry including one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some operations performed by an electronic device 101 may be performed by another external electronic device or a plurality of external electronic devices 102 and 104. According to an embodiment, when the electronic device 101 has to perform any function or service automatically or upon a request, the electronic device 101 may request, instead of or in addition to autonomously executing the function or service, at least a part of a function associated therewith from the external electronic device 102 or 104. The external electronic device 102 or 104 having received the request may execute the requested function or an additional function and may transfer a result thereof to the electronic device 101. The electronic device 101 may provide the received result as it is, or may additionally process the received result to provide the requested functions or service. To this end, for example, a cloud computing technology, a distributed computing technology, or a client-server computing technology may be used.

Figure 2:
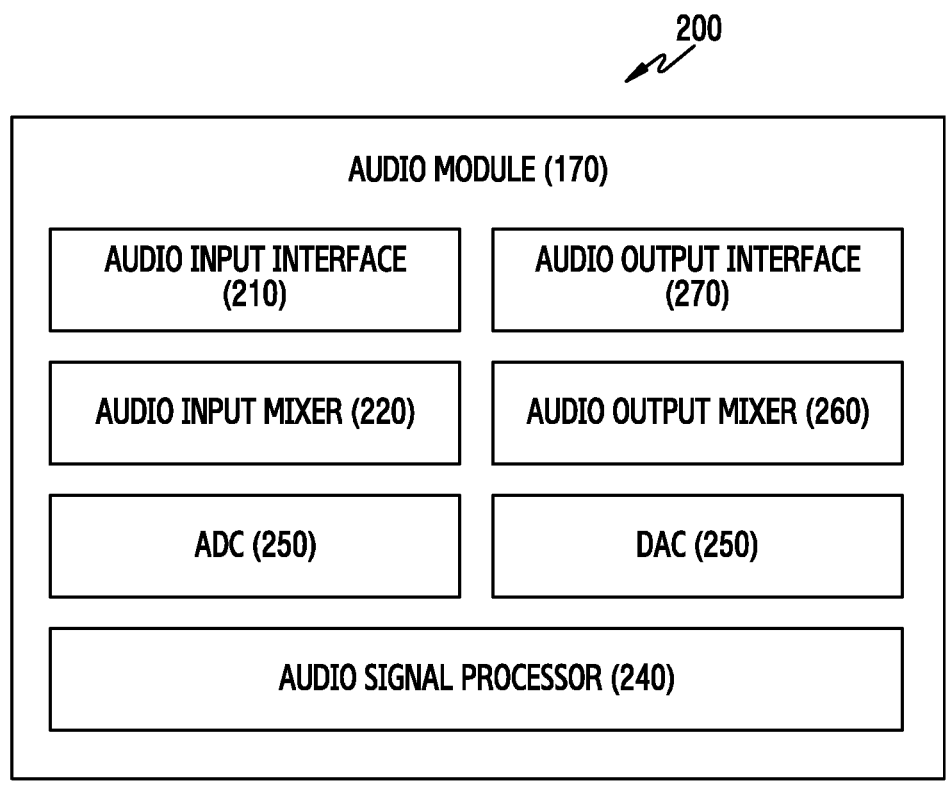
FIG. 2 is a block diagram of an audio module for performing communication between electronic devices according to various embodiments.

FIG. 2 is a block diagram 200 of an audio module 170 that provides an audio signal between electronic devices according to various embodiments.

Referring to FIG. 2, the audio module 170 may include, for example, an audio input interface 210, an audio input mixer 220, an Analog to Digital Converter (ADC) 230, an audio signal processor 240, a Digital to Analog Converter (DAC) 250, an audio output mixer 260, an audio output interface 270, and the like.

The audio input interface 210, audio input mixer 220, and ADC 250 can receive the sound signal, while the audio output interface 270, audio output mixer 260, and DAC 250 output the sound signal.

The audio input interface 210 may receive an audio signal corresponding to a sound acquired from the outside of the electronic device 101 through a microphone (e.g., a dynamic microphone, a condenser microphone, or a piezo electric microphone (or a crystal microphone)) configured as a part of an input device 150 or configured separately from the electronic device 101. For example, when the audio signal is acquired from the external electronic device 102 (e.g., a headset or a microphone), the audio input interface 210 may be connected with the external electronic device 102 by wire through a connection terminal 178 or may be wirelessly (e.g., Bluetooth communication) connected with the external electronic device 102 through a wireless communication module 192 so as to receive the audio signal.

According to an embodiment, the audio input interface 210 may receive a control signal (e.g., a volume control signal using an input button) related to the audio signal acquired from the external electronic device 102. The audio input interface 210 may include a plurality of audio input channels, and may receive different audio signals according to the respective audio input channels. According to an embodiment, additionally or alternatively, the audio input interface 210 may receive an audio signal from another element (e.g., a processor 120 or a memory 130) of the electronic device 101.

The audio input mixer 220 may mix a plurality of input audio signals into at least one audio signal. According to an embodiment, the audio input mixer 220 may mix a plurality of analog audio signals input through the audio input interface 210 into at least one analog audio signal.

The ADC 230 may convert an analog audio signal to a digital audio signal. According to an embodiment, the ADC 230 may convert, to a digital audio signal, an analog audio signal which is received through the audio input interface 210 or, additionally or alternatively, an analog audio signal mixed through the audio input mixer 220.

The audio signal processor 240 may perform various signal processing with respect to a digital audio signal input through the ADC 230 or a digital audio signal received from another element of the electronic device 101. For example, the audio signal processor 240 may perform changing a sample rate for one or more digital audio signals, applying one or more filters, interpolation processing, amplification or reduction (e.g., amplification or reduction of some or all frequency bands) processing, noise processing (e.g., noise or echo reduction), channel changing (e.g., switching between moto and stereo), mixing, extracting a designated signal, or the like. According to an embodiment, at least some functions of the audio signal processor 240 may be implemented in the form of an equalizer.

The DAC 250 may convert a digital audio signal to an analog audio signal. According to an embodiment, the DAC 250 may convert, to an analog audio signal, a digital audio signal processed by the audio signal processor 240 or a digital audio signal acquired from another element of the electronic device 101.

The audio output mixer 260 may mix a plurality of audio signals to be output, into at least one audio signal. According to an embodiment, the audio output mixer 260 may mix an audio signal converted to an analog signal through the DAC 250 and another analog audio signal (e.g., an analog audio signal received through the audio input interface 210) into at least one analog audio signal.

The audio output interface 270 may output an analog audio signal converted through the DAC 250 or, additionally or alternatively, an analog audio signal mixed by the audio output mixer 260 to the outside of the electronic device 101 through a sound output device 155 (e.g., a speaker (e.g., a dynamic driver or a balanced armature driver), a receiver, or the like). According to an embodiment, the sound output device 155 may include a plurality of speakers, and the audio output interface 270 may output audio signals having a plurality of different channels (e.g., stereo or 5.1 channel) through at least some speakers among the plurality of speakers. According to an embodiment, the audio output interface 270 may be connected with the external electronic device 102 (e.g., an external speaker or headset) by wire through the connection terminal 178 or may be wirelessly connected with the external electronic device 102 through the wireless communication module 192 so as to output the audio signal.

According to an embodiment, the audio module 170 may not separately have the audio input mixer 220 or the audio output mixer 260, and may generate at least one digital audio signal by mixing the plurality of digital audio signals, as at least a part of functions of the audio signal processor 240.

According to an embodiment, the audio module 170 may include an audio amplifier (not illustrated) (e.g., a speaker amplification circuit) capable of amplifying an analog audio signal input through the audio input interface 210 or an audio signal to be output through the audio output interface 270. According to an embodiment, the audio amplifier may include a module separate from the audio module 170.

The electronic device according to various embodiments of the present disclosure may be various types of devices. The electronic device may include, for example, at least one among a portable communication device (e.g., a smart phone), a computer device, a portable multimedia device, a portable medical device, a camera, a wearable device, and a home appliance. The electronic device according to one embodiment of the present disclosure is not limited to the above described devices.

In various embodiments of the present disclosure, a singular expression may include a plural expression unless they are definitely different in a context. In the present disclosure, expressions such as "A or B", "at least one of A and/or B" "A, B, or C", "at least one of A, B and/or C", or the like may include all possible combinations of items listed together. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to the another element or connected to the another element through yet another element (e.g., third element).

The term "module" used in the present disclosure may include a unit of hardware, software, or firmware, and may be used interchangeably with terms such as, for example, logic, logic block, component, or circuit. The "module" may be an integrated component, or a minimum unit for performing one or more functions or a part thereof. For example, the module may be configured as an Application-Specific Integrated Circuit (ASIC).

Various embodiments of the present disclosure may be implemented as a software (e.g., a program 140) including an instruction stored in a machine (e.g., a computer)-readable storage medium (e.g., an embedded memory 136 or an external memory 138). The device which invokes a stored instruction from a storage medium and is operable according to the invoked instruction may include an electronic device (e.g., the electronic device 101) according to the disclosed embodiments. When an instruction is executed by a processor (e.g., the processor 120), the processor may directly perform a function corresponding to the instruction or may perform the function by using other elements under control of the processor. The instruction may include a code generated or executed by a compiler or an interpreter. The machine-readable storage medium may be provided in the form of a non-transitory storage medium. Here, "non-temporary" means that the storage medium includes no signal and is tangible, but does not distinguish whether data is stored semi-permanently or temporarily in the storage medium.

According to an embodiment, a method according to various embodiments of the present disclosure may be included in a computer program product to be provided. The computer program product may be traded between a seller and a purchaser as a commodity. The computer program product may be distributed in the form of a machine-readable storage medium (e.g., a compact disc read only memory (CD-ROM)) or online via an application store (e.g., PlayStore™). In the case of on-line distribution, at least a part of the computer program product may be temporarily stored or temporarily created in a storage medium, such as a manufacturer server, an application store server, or a memory of a relay server.

Each element (e.g., a module or a program) according to various embodiments may include a single entity or a plurality of entities, and some sub-elements of the aforementioned sub-elements may be omitted or other sub-elements may be further included in various implementations. Alternatively or additionally, some elements (e.g., a module or a program) may be integrated into a single entity to perform functions the same as or similar to functions performed by each of corresponding elements prior to integration. Operations executed by a module, a programming module, or other elements according to various embodiments may be executed sequentially, in parallel, repeatedly, or in a heuristic manner. Furthermore, some operations may be executed in a different order or may be omitted, or other operations may be added.

Figure 3:
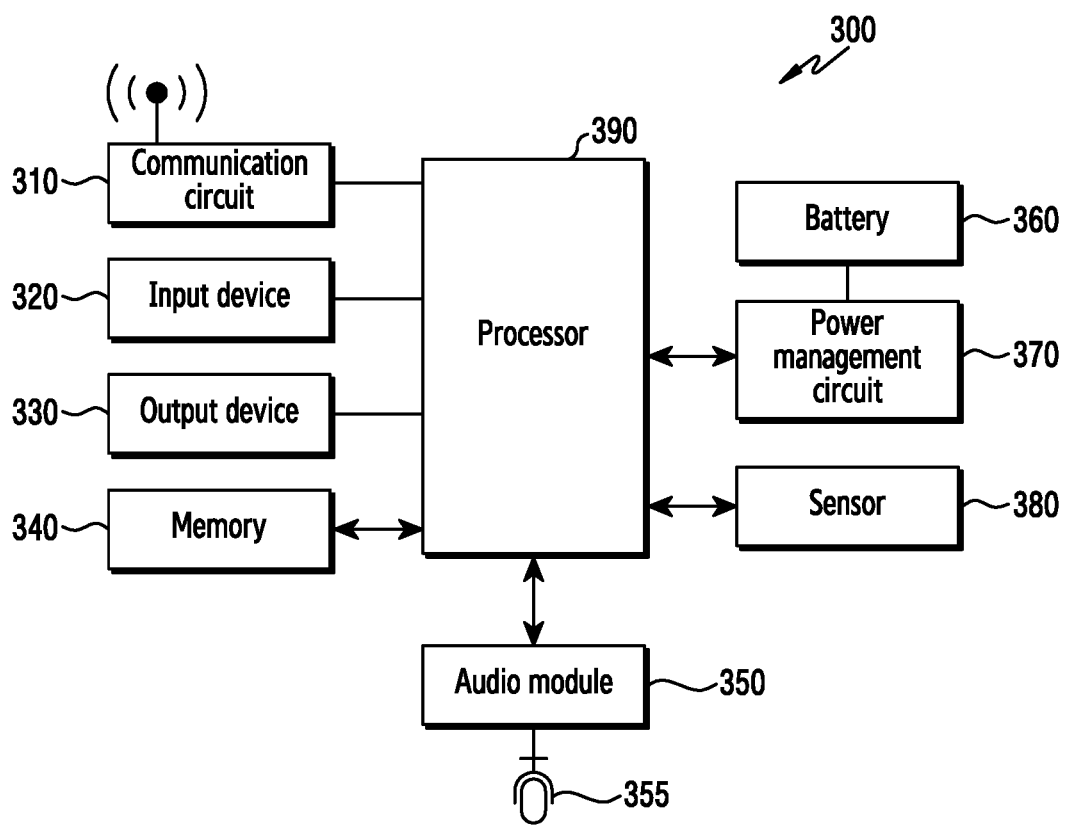
FIG. 3 and FIG. 4 are diagrams illustrating examples of a configuration of an external electronic device according to various embodiments.
Figure 4:
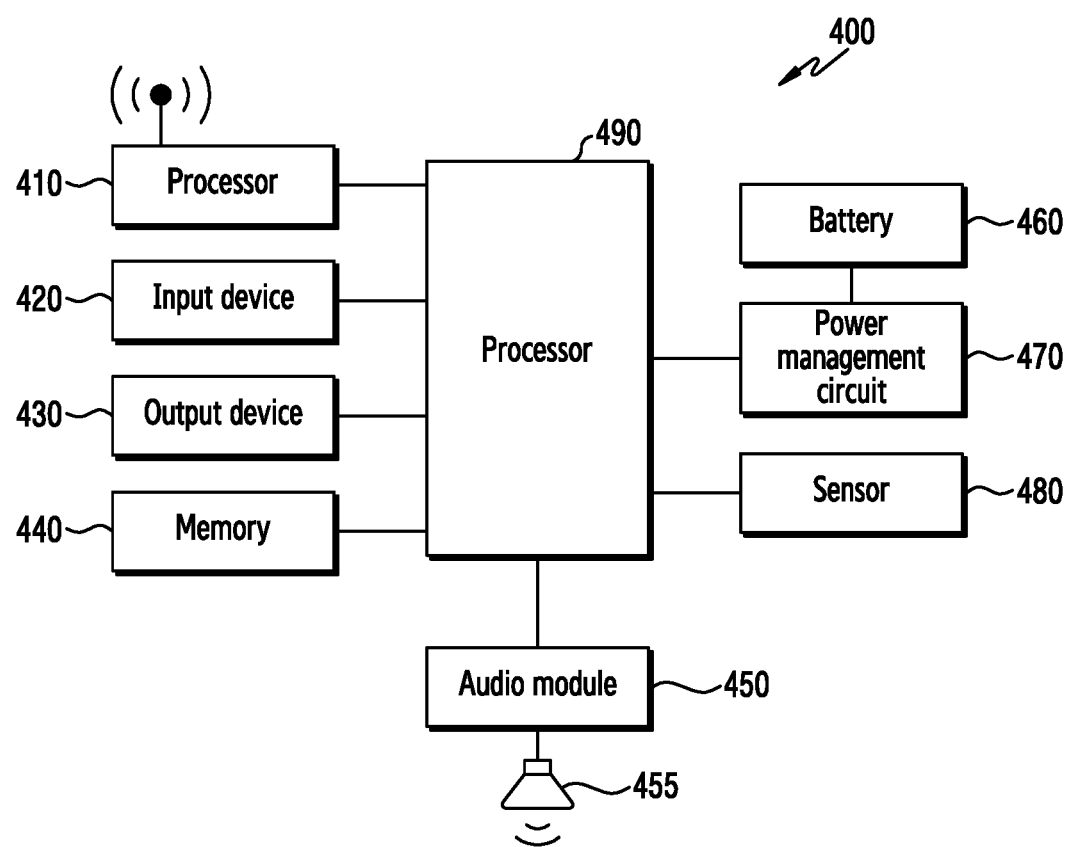

In certain embodiments described in this application, an electronic device 101 can, using single connection, selectively connect one of multiple external devices, such as will be shown in FIG. 3 and FIG. 4. The electronic device 101 can rapidly and repeatedly switch connection from one of the external devices, such as the external device shown in FIG. 3, to another external device, such as the external device shown in FIG. 4.

One of the external devices has an established communication channel with the electronic device 101, while the other has an observer role, which will be described in FIG. 5.

When the electronic device 101 detects a trigger, the electronic device 101 transmits information related to a communication rights transfer. The external devices transfer communication rights, thereby switching observer roles and primary roles, as will be described in FIG. 6. In some embodiments, the external electronic devices can detect the trigger, as will be described in FIGS. 7 and 8.

The operation of each of the electronic devices, e.g, electronic device 101, and external devices will be described in FIGS. 9 (electronic device), 10 (device receiving communication rights), and 11 (device transferring communication rights).

Figure 12:
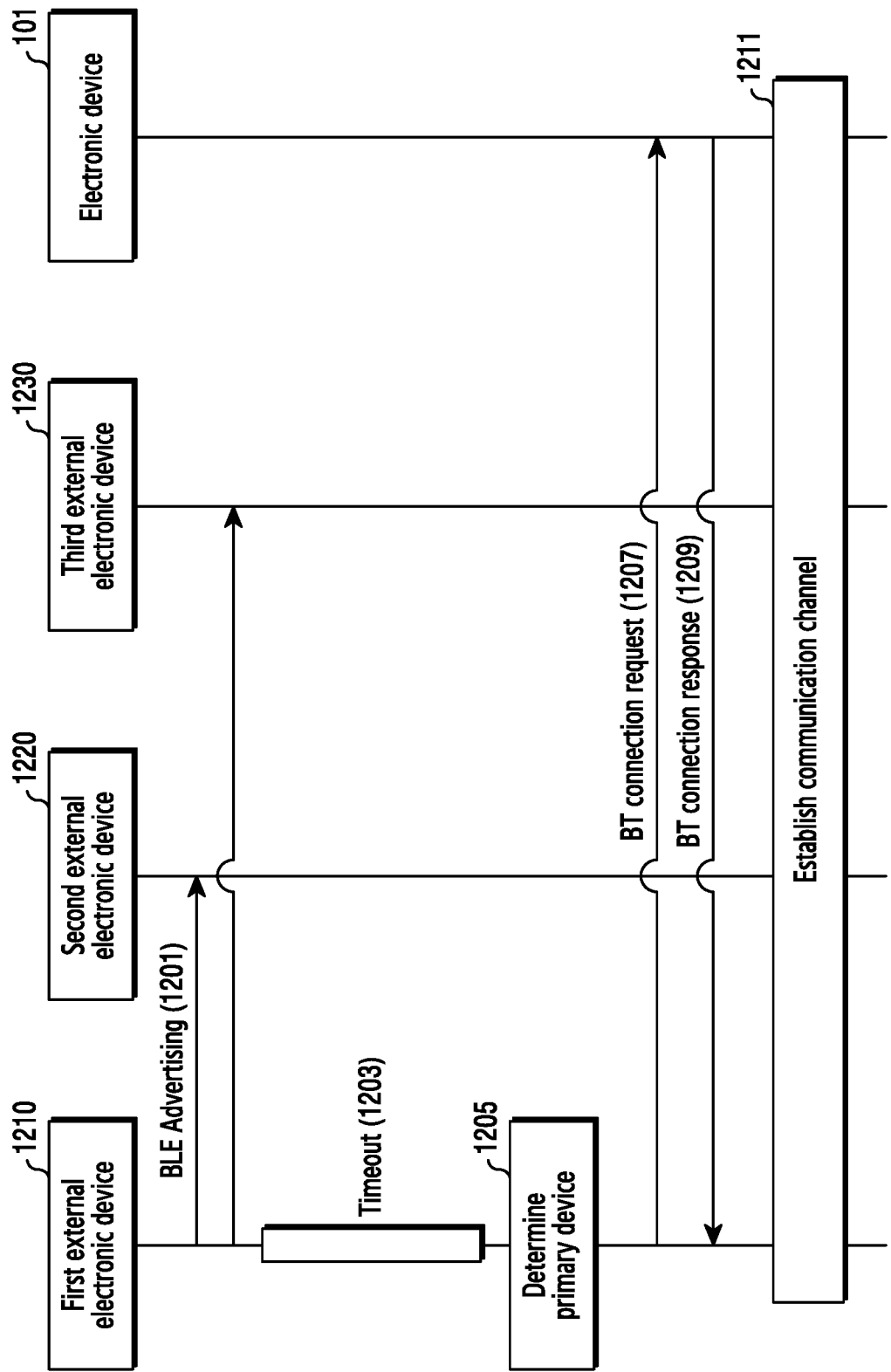
FIG. 12 is a diagram for describing a method for establishing a communication channel between electronic devices in a system according to various embodiments.
Figure 13:
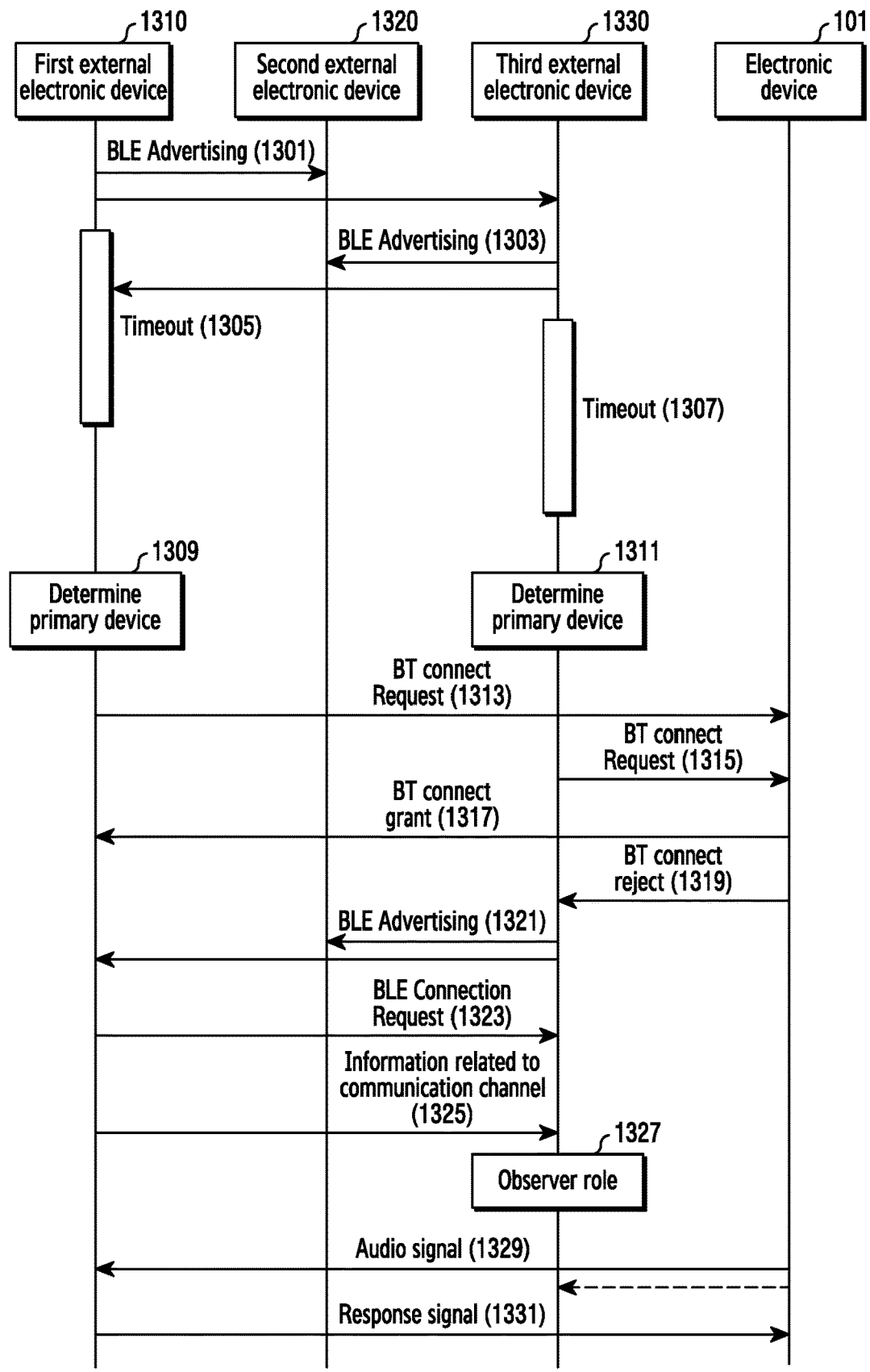
FIG. 13 is a diagram for describing a method for establishing a communication channel between electronic devices to perform communication therebetween in a system according to various embodiments.

FIGS. 12-13 describe determination of the device to take the primary role which receives the communication rights.

Figure 14:
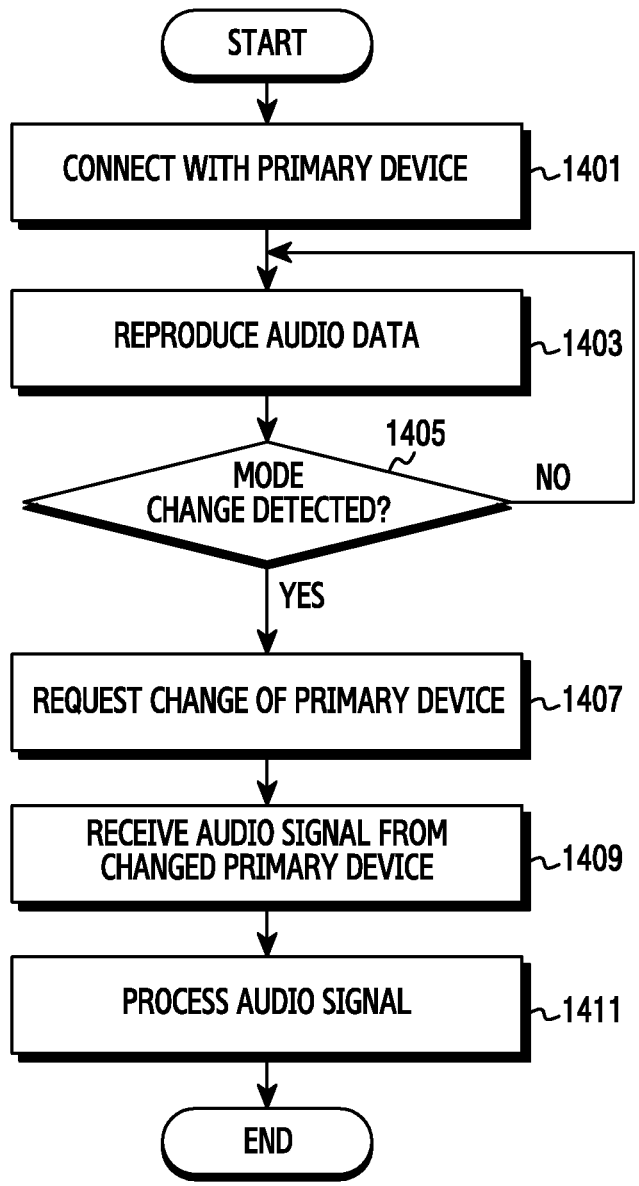
FIG. 14 is a flowchart illustrating an operation method of the electronic device according to various embodiments.
Figure 15:
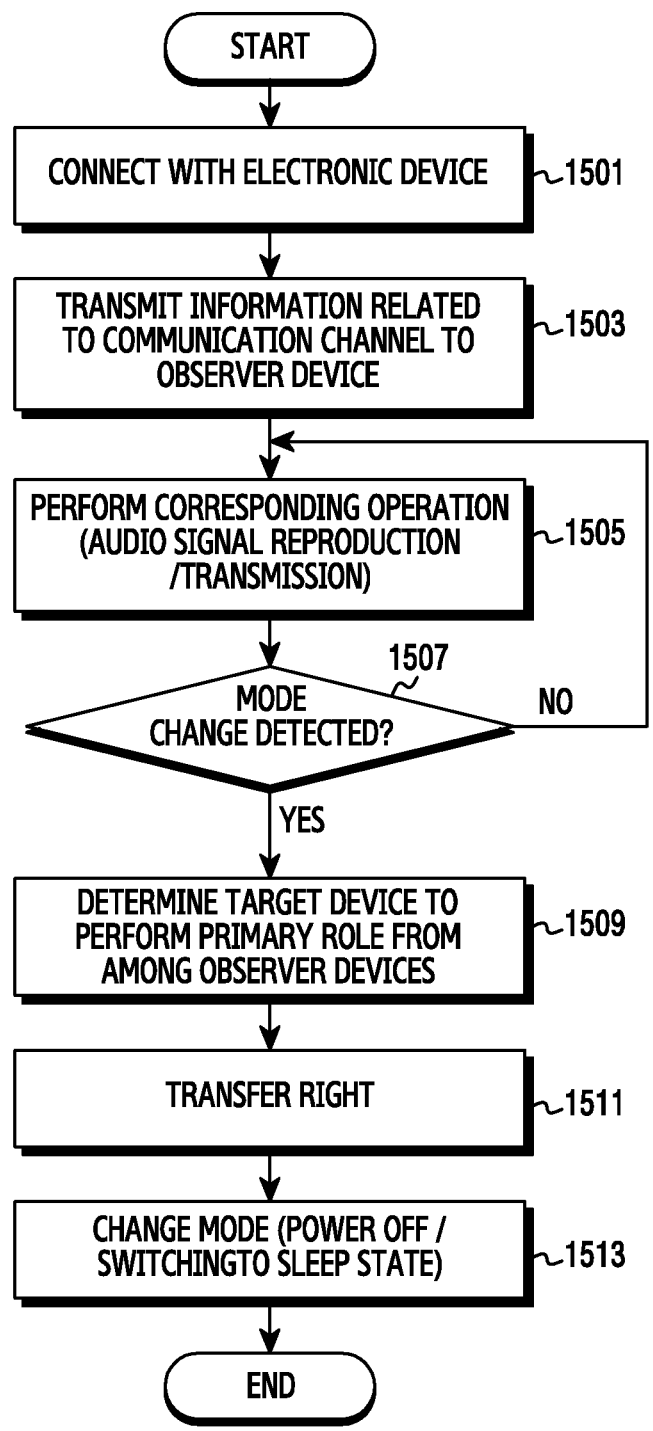
FIG. 15 is a flowchart illustrating an operation method of the electronic device according to various embodiments.
Figure 16:
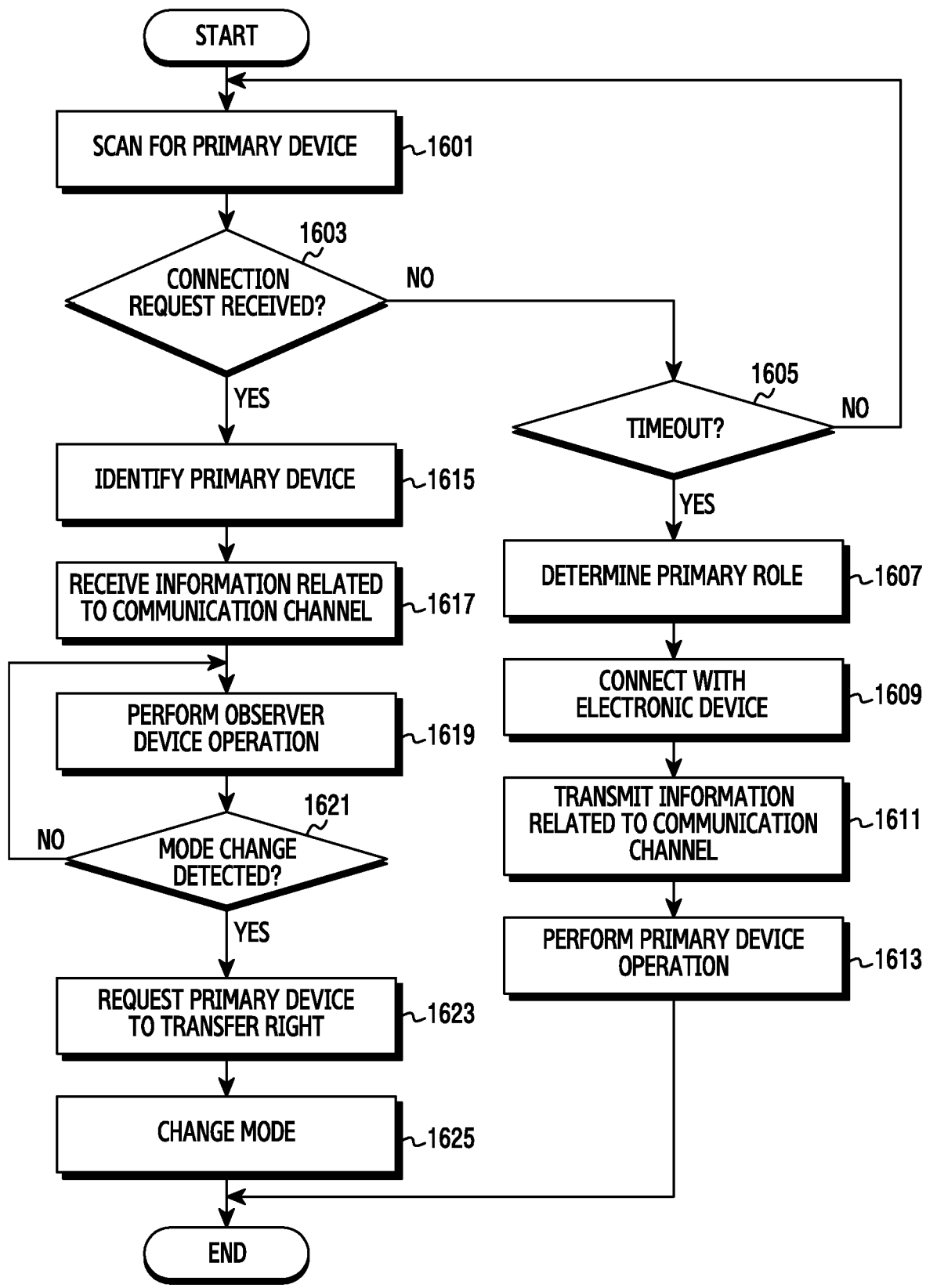
FIG. 16 is a flowchart illustrating an operation method of the electronic device according to various embodiments.

FIG. 14 describes connection of the electronic device to a primary device and changing the primary device. FIG. 15 describes connection of the primary device to the electronic device and transferring communication rights. FIG. 16 describes connection of the observer device and receiving communication rights.

Hereinafter, an example of an external electronic device according to various embodiments will be described with reference to FIG. 3 (microphone) and FIG. 4 (speaker). In various embodiments, an external electronic device may be a device capable of wirelessly connecting with the electronic device 101 according to FIG. 1 and capable of communicating with the electronic device 101 (e.g., transmitting or receiving data or audio signals). According to various embodiments, on the basis of information related to a communication channel established between the electronic device 101 and another external electronic device wirelessly connected with the electronic device 101, the external electronic device may receive an audio signal transmitted from the electronic device 101 to the external electronic device at the another external electronic device. This may be referred to as a sniffing (or snooping) scheme. In various embodiments, the external electronic device may be an audio device (e.g., a first speaker device and a second speaker device).

According to various embodiments, the electronic device 101 and the external electronic device may establish a wireless communication channel. The another external electronic device may receive information related to the communication channel, participate in a wireless communication channel on the basis of the information related to the communication channel, and transmit data to the electronic device 101. For example, audio data may be transmitted.

According to various embodiments, the external electronic device may be classified into a first audio device (e.g., a microphone device) that provides a microphone function, and a second audio device (e.g., a speaker device) that provides a speaker function. For example, in various embodiments, a microphone device may be provided as a separate device from a speaker device in the external electronic device capable of functionally interworking with the electronic device 101. The electronic device 101 may enable an audio path to be set between a plurality of external electronic devices through a single wireless communication connection with the plurality of external electronic devices.

In various embodiments, the external electronic device (e.g., the first audio device and the second audio device) may be classified as a primary device or an observer device on the basis of whether the external electronic device is directly connected with the electronic device 101 via a designated communication scheme (e.g., Bluetooth communication). For example, in various embodiments, it may be determined whether the external electronic device serves a primary role or an observer role, on the basis of whether a communication channel (or a wireless communication link) capable of bidirectional communication is formed (established) between the external electronic device and the electronic device 101. Alternatively, it may be determined whether the external electronic device serves a primary role or an observer role, on the basis of whether the external electronic device transmits data to the electronic device 101 by using a communication channel capable of bidirectional communication between the external electronic device and the electronic device 101. According to an embodiment, at least on the basis of whether external electronic devices transmit data (e.g., ACK or NACK) related to whether data is received or a control signal (e.g., requesting for executing a function of the electronic device by a button of the external electronic device) for controlling the electronic device 101 to the electronic device 101, primary roles or observer roles of the external electronic devices may be determined or changed (e.g., a master change). In various embodiments, the communication channel capable of bidirectional communication may perform communication using Bluetooth or at least a part of Bluetooth protocols.

In various embodiments, the external electronic device may receive an audio signal from the electronic device 101 through a designated communication channel (e.g., a Bluetooth communication channel). According to an embodiment, when the external electronic device is a second audio device, the second audio device may decode, using a codec, the audio signal received from the electronic device 101 so as to output (or reproduce) sound through a speaker. The second audio device (e.g., a left speaker device) may transmit, additionally or selectively, the audio signal received from the electronic device 101 to another second audio device (e.g., a right speaker device). For example, the second audio device may receive a stereo audio signal from the electronic device 101 and, after the audio signal is decoded through a codec, the second audio device may output one channel (e.g., a left channel) to a speaker of the second audio device and may transmit another channel (e.g., a right channel) to another second audio device.

According to an embodiment, when the external electronic device is a first audio device, the first audio device may not output the audio signal received from the electronic device 101. For example, when the external electronic device does not have a speaker for sound output, such as a second audio device, the external electronic device may ignore or omit outputting the received audio signal without performing the same.

In various embodiments, in a case where the external electronic device performs a primary role, when the external electronic device establishes a communication channel with the electronic device 101 in a designated communication scheme, the external electronic device may acquire information related to the established communication channel. In various embodiments, the information related to the communication channel may be referred to as communication information (COMM information) or a communication parameter. The information related to the communication channel indicates information for channel communication between two devices (e.g., the electronic device 101 and an external electronic device) in Bluetooth communication, and may be shared (or transmitted) with one or more external electronic devices previously identified (or authenticated) by the electronic device 101. By sharing of the information related to the communication channel, another external electronic device (e.g., an observer device) that receives the shared information may receive (or sniff) an audio signal of a corresponding channel.

In various embodiments, when the external electronic device and the electronic device 101 establish a communication channel on the basis of Bluetooth protocols, information relating to the communication channel may include at least one communication related parameter, such as BD_ADDR (Bluetooth device address), LT_ADDR (logical transport address), a native clock of SRC (source) (e.g., an audio source device, for example, the electronic device 101), a clock offset between SRC and SNK (sink) (e.g., a primary device), an encryption parameter (e.g., key change) for a link between SRC and SNK, and the like. In various embodiments, the external electronic device may acquire information relating to the communication channel by exchanging information (or signal) in establishing communication with the electronic device 101. In various embodiments, the information related to the communication channel may further include identification information (e.g., an identifier (ID) and address information (e.g., BD address)) of the external electronic device.

In various embodiments, the external electronic device that performs a primary role (hereinafter, a primary device) may establish a Bluetooth communication channel (e.g., an Advanced Audio Distribution Profile (A2DP) or a Hands-Free Profile (HFP)) for audio signal transmission to or audio signal reception from the electronic device 101 (e.g., audio signal reception according to music reproduction of the electronic device 101, audio signal (or a voice signal) reception from the electronic device 101 according to call execution, and transmission of audio signal (or a voice signal) input to a microphone of the external electronic device). The external electronic device may transfer information related to the established communication channel to an external electronic device that performs an observer role (hereinafter, an observer device). According to an embodiment, a primary device may combine information on whether the primary device itself has received an audio packet with information on whether observer devices have received audio packets and, when a specific audio packet has not been received, the primary device may transmit a response signal (e.g., an ACK signal or an NACK signal) to the electronic device 101 so as to enable the corresponding audio packet to be retransmitted from the electronic device 101. In various embodiments, a first audio device or a second audio device may perform a primary role.

In various embodiments, when the external electronic device performs an observer role, the external electronic device may acquire (e.g., receive or observe) an audio signal transmitted through a communication channel (e.g., a wireless communication link) established between the electronic device 101 and a primary device, by using information related to the communication channel, which is acquired from the primary device. For example, the observer device may receive (or sniff) the audio signal by using the information related to the communication channel shared from the primary device so as to reproduce the received audio signal using a speaker.

According to various embodiments, when the observer device is a second audio device, the observer device may output at least one channel (e.g., a right channel) of the received (or sniffed) audio signal through a speaker. According to various embodiments, a first audio device or a second audio device may perform an observer role, and there may be multiple observer devices within a system.

External Devices

FIG. 3 is a diagram schematically illustrating a configuration of an external electronic device according to various embodiments.

Referring to FIG. 3, an external electronic device 300 illustrated in FIG. 3 may represent a first audio device (e.g., a microphone device) having a microphone corresponding to the audio input interface 210 of FIG. 2. For example, the first audio device 300 may be a Bluetooth microphone device that may be connected with the electronic device 101 or a second audio device.

As illustrated in FIG. 3, the external electronic device 300 (e.g., a first audio device) according to various embodiments may include, for example, a communication circuit 310, an input device 320, an output device 330, a memory 340, an audio module 350, a microphone 355, a battery 360, a power management circuit 370, a sensor 380, a processor 390, and the like. In various embodiments, since elements illustrated in FIG. 3 are not necessary, the external electronic device 300 may be implemented including more elements or fewer elements than the elements illustrated in FIG. 3.

In certain embodiments, the microphone 355 receives voice input from a user and converts sound to electrical signals that are digitized by the audio module 350 and provided to the processor 390. The processor 390 can process the digitized electrical signals. The communication circuit 310 can transmit the electrical signals representing voice input to, for example, the electronic device 101. For purposes of future discussion, the term "audio signal" may include analog or digital electrical signals, representing sound. The communication circuit 310 may have the same or similar configuration as that of, for example, the wireless communication module 192 of FIG. 1. The communication circuit 310 may include one or more modules that enable wireless communication between the electronic device 101 and the external electronic device 300. For example, the communication circuit 310 may include a module (e.g., a short range communication circuit) for performing wireless communication with a neighboring electronic device and/or another external electronic device. According to an embodiment, the communication circuit 310 may include one or more modules (e.g., a Bluetooth module, a Bluetooth low energy (BLE) module, etc.) for performing short range communication. For example, Bluetooth, BLE, radio frequency identification (RFID), infrared communication (IrDA), ultra-wideband (UWB), ZigBee, NFC, or the like may be used as a short range communication technology.

The communication circuit 310 may interwork with an external device (e.g., the electronic device 101, another external electronic device, etc.) connected with the external electronic device 300 via a network (e.g., a short range communication network) so as to transmit various data to or receive various data from the external device. According to an embodiment, when a communication channel is established between the external electronic device 300 and the electronic device 101 (e.g., the external electronic device 300 performs a primary role) in a designated communication scheme (e.g., Bluetooth communication), the communication circuit 310 may transmit information relating to the established communication channel to another external electronic device (e.g., an observer device). According to an embodiment, when a communication channel is established between the electronic device 101 and another external electronic device (e.g., a primary device) in a designated communication scheme (e.g., a case where another external electronic device performs a primary role and the external electronic device 300 performs an observer role), the communication circuit 310 may receive information related to the communication channel from the another external electronic device (e.g., a primary device).

According to various embodiments, the communication circuit 310 may operate to transmit, to the electronic device 101, an audio signal (e.g., a user's voice signal) that is input through a microphone 355 from the outside (e.g., a user).

According to various embodiments, the communication circuit 310 may transmit, to another external electronic device, information (e.g., rights transfer information) related to a communication rights transfer for transferring a primary role to the another external electronic device, or may receive information related to the communication rights transfer from the electronic device 101 or the another external electronic device. According to an embodiment, the communication rights transfer (or rights transfer) may include, for example, acquiring a trigger for transferring a communication rights of a primary device to another external electronic device (e.g., an observer device). For example, for a communication rights transfer, a notification of performing a specific function is transmitted from the electronic device 101, or an associated trigger may be transferred at least on the basis of a data request for performing the specific function by the electronic device 101.

In various embodiments, the communication rights transfer may include transferring a primary role of one of external electronic devices to a specific observer device within the system. In various embodiments, the communication rights transfer may start from a primary device, and the existing primary device may perform an observer role after completing a rights transfer. In various embodiments, when the external electronic device 300 (e.g., a device that provides (or performs) a microphone function) performs an observer role, monitoring for checking whether the microphone 355 is turned on may be included.

The input device 320 may have the same or similar configuration as that of, for example, the input device 150 of FIG. 1. The input device 320 may generate input data for controlling operation of the external electronic device 300 in response to a user input. The input device 320 may include at least one configuration for detecting various inputs of the user. For example, the input device 320 may include a keypad, a dome switch, a physical button, a (capacitive/resistive type of) touch pad, a jog & shuttle, etc.

A part of the input device 320 may be implemented as a button on the outside of the external electronic device 300, and the whole or part of the input device 320 may be implemented as a touch panel. The input device 320 may receive a user input for initiating various operations (e.g., a voice recognition service (or a voice recognition function), an application execution function, a volume control function, a sniffing function, a power on/off function, etc.) of the external electronic device 300, and may generate an input signal according to the user input.

The output device 330 may include a device for visually providing information to a user. For example, the output device 330 may be implemented as the display device 160 in FIG. 1, a light emitting diode (LED), or the like, and may include a medium role that shows the output from the external electronic device 300 to the user. According to an embodiment, the output device 330 may provide various outputs for feeding back, to a user, information (e.g., information for identifying whether a state is an activated state or a deactivated state) related to performing a function (e.g., a voice recognition function, a sniffing function, etc.) of the external electronic device 300.

The memory 340 may have the same or similar configuration as that of, for example, the memory 130 in FIG. 1. The memory 340 may store one or more programs executed by the processor 390, and may perform a function for temporarily storing (e.g., buffering) input/output data. The input/output data may include, for example, an audio signal, information related to a communication channel, a response signal (ACK/NACK), information related to a communication rights transfer (or rights transfer information), or the like. The memory 340 is responsible for storing acquired data, data acquired in real time may be stored in a temporary storage device (e.g., buffer), and data that is confirmed to be stored may be stored in a storage device available for long term storage.

The audio module 350 may have the same or similar configuration as that of, for example, the audio module 170 of FIG. 1 or FIG. 2. When the external electronic device 300 is a first audio device (e.g., a microphone device) or operates as a first audio device, the audio module 350 may transfer an audio signal, such as a voice received from the microphone 355, to the processor 390. According to various embodiments, a variety of noise reduction algorithms may be implemented in the microphone 355 to remove noise generated in receiving an external sound signal.

The battery 360 may have the same or similar configuration as that of, for example, the battery 189 of FIG. 1. The battery 360 is a device for supplying power to at least one element of the external electronic device 300 and may include, for example, a rechargeable battery and/or a solar battery.

The power management circuit 370 may have the same or similar configuration as that of, for example, the power management module 188 of FIG. 1. The power management circuit 370 may be controlled by the processor 390 to receive power applied from the battery 360 so as to supply power necessary for operation of each element. According to various embodiments, the power management circuit 370 may include, for example, a remaining battery amount measurement circuit (e.g., a fuel gauge), a PMIC, a charging circuit, a booster circuit, and the like.

The sensor 380 may have the same or similar configuration as that of, for example, the sensor module 176 of FIG. 1. The sensor 380 may sense the movement and position of the external electronic device 300, and may provide sensing information according to a sensing result to the processor 390. According to an embodiment, the external electronic device 300 may sense a state of use (e.g., whether the external electronic device 300 or a user is moving) through the sensor 380 (e.g., an acceleration sensor, etc.), and may operate in a sleep mode (or a lower power mode) when the external electronic device 300 is not in use (e.g., when no movement or position change is detected).

The processor 390 (e.g., a control circuit or a processor including a processing circuit) may control overall operation of the external electronic device 300.

According to an embodiment, when the external electronic device 300 performs a primary role, the processor 390 may establish a communication channel by using a designated communication scheme (e.g., Bluetooth communication) with the electronic device 101, through the communication circuit 310 (e.g., a short range communication circuit). The processor 390 may transmit information related to the communication channel to another electronic device (e.g., an external electronic device that performs an observer role) through the communication circuit 310 in response to establishment of the communication channel with the electronic device 101. The processor 390 may perform control to transmit an audio signal (e.g., a voice signal), which is input from a user through the microphone 355 of the audio module 350, to the electronic device 101 through the communication circuit 310.

The processor 390 may acquire (e.g., receive or detect) information related to a communication right transfer, while the external electronic device 300 is performing a primary role. In various embodiments, the information related to the communication rights transfer (or rights transfer information) may include information related to or a notification that a call is received at the electronic device 101, information related to or a notification of a battery state of the external electronic device 300, information related to or a notification of execution or termination of a function (e.g., a voice recognition service) using the external electronic device 300 of a user, information or a notification of requiring a communication rights from another external electronic device (e.g., information relating to power-on of a microphone device or information relating to function activation (e.g., activation by pressing a record button by a user, etc.)), or the like.

The processor 390 may perform processing to transfer communication rights to the another external electronic device (e.g., an observer device) to enable the another external electronic device (e.g., an observer device) to communicate (e.g., bidirectional communication) with the electronic device 101 through the communication channel, at least on the basis of acquiring information related to the communication rights transfer.

According to an embodiment, when the external electronic device 300 performs an observer role, the processor 390 may acquire, from the another external electronic device (e.g., a primary device), information related to a communication channel connected between the electronic device 101 and the another external electronic device (e.g., a primary device), by using a designated communication scheme (e.g., Bluetooth communication) through the communication circuit 310 (e.g., a short range communication circuit). According to an embodiment, when the external electronic device 300 is a microphone, the processor 390 may not receive (or sniff) an audio signal of the communication channel, even if the information related to the communication channel is acquired. According to an embodiment, when the external electronic device 300 is a microphone, data related to whether or not the microphone is activated may be received (or monitored).

The processor 390 may receive an instruction transmitted from the another external electronic device (e.g., a primary device) in relation to the communication rights transfer while the external electronic device 300 is performing an observer role. In various embodiments, the instruction may include an instruction related to execution of a function (e.g., a voice recognition function, a call function, etc.) using the external electronic device 300 of a user or an instruction related to the communication rights transfer requested by the another external electronic device (e.g., a primary device). The processor 390 may acquire information related to the communication channel from the external electronic device that performs a primary role, at least on the basis of the received instruction. The processor 390 may acquire an audio signal (e.g., a user's voice signal related to a call function or a voice recognition function) related to the communication rights transfer by using a microphone 355 electrically or functionally connected with the external electronic device 300. The processor 390 may perform processing to transmit the acquired audio signal to the electronic device 101 through the communication circuit 310, on the basis of a communication rights.

In various embodiments, when the external electronic device 300 performs a primary role, the processor 390 may perform processing to transmit data (e.g., a response signal (an ACK signal or NACK signal related to retransmission of an audio signal) received from the another external electronic device (e.g., an observer device) and data (e.g., a voice signal) acquired through the microphone 355 to the electronic device 101 through the communication circuit 310. According to an embodiment, the external electronic device 300 may check whether the electronic device 101 has received audio and may check data (e.g., a response signal (an ACK signal or NACK signal related to retransmission of an audio signal)) received from the another external electronic device (e.g., an observer device), so as to transmit as data whether the two external electronic devices have received audio.

According to various embodiments, the processor 390 may be implemented as one or more processors that control operation of the external electronic device 300 by executing one or more programs stored in the memory 340. According to various embodiments, the processor 390 may be electrically or functionally connected with a hardware module, such as the communication circuit 310, the memory 340, and the audio module 350 of the external electronic device 300, so as to control operations of the hardware module. Control (or processing) operations of the processor 390 according to various embodiments of the present disclosure may be described in detail with reference to the following drawings.

FIG. 4 is a diagram schematically illustrating a configuration of an external electronic device according to various embodiments.

Referring to FIG. 4, an external electronic device 400 illustrated in FIG. 4 may represent an example of a second audio device (e.g., a speaker device) having a speaker corresponding to the audio output interface 270 of FIG. 2. For example, the second audio device 400 may be a Bluetooth speaker device that may be connected with the electronic device 101 or the first audio device 300, and each of a left audio channel output device and a right audio channel output device thereof may have the same structure. According to various embodiments, the second audio device 400 may have a structure in which a single device outputs all stereo channels.

As illustrated in FIG. 4, the external electronic device 400 (e.g., a second audio device) according to various embodiments may include, for example, a communication circuit 410, an input device 420, an output device 430, a memory 440, an audio module 450, a battery 460, a power management circuit 470, a sensor 480, a processor 490, and the like. In various embodiments, since the elements illustrated in FIG. 4 are not necessary, the external electronic device 400 may be implemented including more elements or fewer elements than the elements illustrated in FIG. 4.

In various embodiments, the second audio device 400 and the first audio device 300 may at least partially include the common elements, excluding a microphone 355 from the audio module 350 among the elements of the first audio device 300 of FIG. 3. For example, the communication circuit 410, the input device 420, the output device 430, the memory 440, the battery 460, the power management circuit 470, and the sensor 480 illustrated in FIG. 4 may correspond to the communication circuit 310, the input device 320, the output device 330, the memory 340, the battery 360, the power management circuit 370, and the sensor 380 illustrated in FIG. 3, respectively. Hereinafter, in description of FIG. 4, a part of the configuration or description corresponding to that made with reference to FIG. 3 will be omitted.

The communication circuit 410 may interwork with an external device (e.g., the electronic device 101, another external electronic device, etc.) connected with the external electronic device 400 via a network (e.g., a short range communication network) so as to transmit various data to or receive various data from the external device. According to an embodiment, when a communication channel is established between the external electronic device 400 and the electronic device 101 (e.g., the external electronic device 400 performs a primary role) in a designated communication scheme (e.g., Bluetooth communication), the communication circuit 410 may transmit information relating to the established communication channel to another external electronic device (e.g., an observer device). According to an embodiment, when a communication channel is established between the electronic device 101 and another external electronic device (e.g., a primary device) in a designated communication scheme (e.g., a case where another external electronic device performs a primary role and the external electronic device 400 performs an observer role), the communication circuit 410 may receive information related to the communication channel from the another external electronic device (e.g., a primary device).

According to an embodiment, the communication circuit 410 may receive or sniff an audio signal from the electronic device 101. For example, the communication circuit 410 may directly receive an audio signal from the electronic device 101 when the external electronic device 400 operates as a primary device, and may sniff an audio signal when the external electronic device 400 operates as an observer device. According to an embodiment, the communication circuit 410 may output (or reproduce), through a speaker 455, an audio signal that is received from the electronic device 101 or acquired in a sniffing scheme.

The input device 420 may generate input data for controlling operation of the external electronic device 400 in response to a user input. The input device 420 may receive a user input for initiating various operations (e.g., a volume control, a sniffing function, etc.) of the external electronic device 400 and may generate an input signal according to the user input.

The output device 430 may include a device for visually providing information to a user. For example, the output device 430 may be implemented as the display device 160 in FIG. 1, a light emitting diode (LED), or the like, and may include a medium role that shows the output from the external electronic device 400 to the user. According to an embodiment, the output device 430 may provide various outputs for feeding back, to a user, information (e.g., information for identifying whether a state is an activated state or a deactivated state) related to performing a function (e.g., an audio signal reproduction function, a sniffing function, etc.) of the external electronic device 400.

The memory 440 may have the same or similar configuration as that of, for example, the memory 130 in FIG. 1. The memory 440 may store one or more programs executed by the processor 490, and may perform a function for temporarily storing (e.g., buffering) input/output data. The input/output data may include, for example, an audio signal, information related to a communication channel, a response signal (ACK/NACK), information related to a communication rights transfer, or the like.

The audio module 450 may have the same or similar configuration as that of, for example, the audio module 170 of FIG. 1 or FIG. 2. When the external electronic device 400 is a second audio device (e.g., a speaker device) or operates as a second audio device, the audio module 450 may output (or reproduce) an audio signal received from the electronic device 101 or an audio signal acquired through sniffing, through the speaker 455.

The battery 460 may have the same or similar configuration as that of, for example, the battery 189 of FIG. 1. The battery 460 may include a device for supplying power to at least one element of the external electronic device 400.

The power management circuit 470 may have the same or similar configuration as that of, for example, the power management module 188 of FIG. 1. The power management circuit 470 may be controlled by the processor 490 to receive power applied from the battery 460 so as to supply power necessary for operation of each element.

The sensor 480 may have the same or similar configuration as that of, for example, the sensor module 176 of FIG. 1. The sensor 480 may sense the movement and position of the external electronic device 400, and may provide sensing information according to a sensing result to the processor 490. According to an embodiment, the external electronic device 400 may sense a state of use (e.g., whether the external electronic device 400 or a user is moving) through the sensor 480 (e.g., an acceleration sensor, etc.), and may operate in a sleep mode (or a lower power mode) when the external electronic device 400 is not in use (e.g., when no movement or position change is detected).

The processor 490 (e.g., a control circuit or a processor including a processing circuit) may control overall operation of the external electronic device 400.

According to an embodiment, when the external electronic device 400 performs a primary role, the processor 490 may establish a communication channel by using a designated communication scheme (e.g., Bluetooth communication) with the electronic device 101, through the communication circuit 410 (e.g., a short range communication circuit). The processor 490 may transmit information related to the communication channel to another electronic device (e.g., an external electronic device that performs an observer role, for example, the first audio device 300 and another second audio device) through the communication circuit 410 in response to establishment of the communication channel with the electronic device 101. The processor 490 may perform control to output, through the audio module 450, an audio signal received from the electronic device 101 via the communication circuit 410.

The processor 490 may acquire (e.g., receive or detect) information related to a communication rights transfer (e.g., rights transfer information), while the external electronic device 400 is performing a primary role. In various embodiments, the information related to the communication rights transfer may include information related a call received at the electronic device 101, information related to a battery state of the external electronic device 400, information requiring a communication rights from another external electronic device, or the like. The processor 490 may perform processing to transfer a communication rights to the another external electronic device (e.g., an observer device) to enable the another external electronic device (e.g., an observer device) to communicate (e.g., bidirectional communication) with the electronic device 101 through the communication channel, at least on the basis of acquiring information related to the communication rights transfer.

According to an embodiment, when the external electronic device 400 performs an observer role, the processor 490 may receive, from the another external electronic device (e.g., a primary device), information related to a communication channel established between the electronic device 101 and the another external electronic device (e.g., an external electronic device that performs a primary role) in a designated communication scheme (e.g., Bluetooth communication), through the communication circuit 410 (e.g., a short range communication circuit). The processor 490 may perform control to acquire, in a sniffing scheme, an audio signal (or an audio packet) of the communication channel established between the electronic device 101 and the another external electronic device (e.g., a primary device) by using information related to the communication channel so as to output (or reproduce) the acquired audio signal.

The processor 490 may receive an instruction transmitted from the another external electronic device (e.g., a primary device) in relation to the communication rights transfer while the external electronic device 400 is performing an observer role. In various embodiments, the instruction may include an instruction related to the communication rights transfer requested by the another external electronic device (e.g., a primary device). The processor 490 may acquire a communication rights related to the communication channel from the external electronic device performing a primary role at least on the basis of the received command. The processor 490 may perform processing to receive an audio signal related to the communication rights transfer (e.g., an audio signal of music reproduced in the electronic device 101, an audio signal related to a call, or the like) from the electronic device 101 and output (or reproduce) the received audio signal by using the speaker 455 electrically or functionally connected with the external electronic device 400, in response to acquiring the communication rights.

According to an embodiment, in relation to the communication rights transfer, the processor 490 may request a rights transfer from the another external electronic device (e.g., a primary device) while the external electronic device 400 is performing an observer role.

According to various embodiments, the processor 490 may be implemented as one or more processors that execute one or more programs stored in the memory 440 so as to control operation of the external electronic device 400. According to various embodiments, the processor 490 may be electrically or functionally connected with a hardware module, such as the communication circuit 410, the memory 440, and the audio module 450 of the external electronic device 400, so as to control operation of the hardware module. Controlling (or processing) of the processor 490 according to various embodiments of the present disclosure will be described in detail with reference to the following drawings.

As described above, an electronic device (e.g., a primary device, for example, the external electronic device 400 of FIG. 4) according to various embodiments includes a short range communication circuit (e.g., the communication circuit 410) and the processor 490, wherein the processor 490 is configured to: establish a communication channel with a first external electronic device (e.g., the electronic device 101 of FIG. 1) by using a designated communication scheme; transmit information related to the communication channel to a second external electronic device (e.g., an observer device, for example, the external electronic device 300 of FIG. 3) through the short range communication circuit 410; acquire rights transfer information related to transferring of communication rights that enables the second external electronic device to communicate with the first external electronic device through the short range communication circuit 410; and, at least on the basis of the rights transfer information, transfer the communication rights of the electronic device (e.g., a primary device) to the second external electronic device so that the second external electronic device communicates with the first external electronic device.

According to various embodiments, the processor 490 may be configured to acquire the rights transfer information from the first external electronic device or the second external electronic device through the short range communication circuit, wherein the rights transfer information includes information for acquisition of an external audio signal by using the second external electronic device.

According to various embodiments, the rights transfer information may further include information related to a call received at the first external electronic device or information related to voice recognition of the second external electronic device.

According to various embodiments, the processor 490 may be configured to transfer the communication rights to the second external electronic device so that the second external electronic device transmits the external audio signal to the first external electronic device.

According to various embodiments, the processor 490 may be configured to transmit a response signal related to whether the audio signal received from the first external electronic device is not received, to the first external electronic device through a first communication channel.

According to various embodiments, the processor 490 may be configured to determine the response signal at least on the basis of a reception state (e.g., reception/non-reception related information) of the audio signal received from the first external electronic device and a reception state of the audio signal received from the second external electronic device, and to transmit the determined response signal to the first external electronic device through the first communication channel.

According to various embodiments, the processor 490 may be configured to establish a first communication channel with the first external electronic device in a designated communication scheme through the short-range communication circuit, and to establish a second communication channel with the second external electronic device in a designated communication scheme through the short-range communication circuit.

As described above, an electronic device according to various embodiments (e.g., an observer device, for example, the external electronic device 300 of FIG. 3) may include a short range communication circuit (e.g., the communication circuit 310) and the processor 390, wherein the processor 390 is configured to: receive information related to a communication channel connected between a first external electronic device (e.g., the external electronic device 400) and a second external electronic device (e.g., the electronic device 101) from the first external electronic device by using a designated communication scheme through the short communication circuit 310; acquire rights transfer information related to transferring of communication rights that enables communication with the second external electronic device; receive the communication rights transferred from the first external electronic device, at least on the basis of the rights transfer information; acquire an audio signal by using the microphone 355 functionally connected with the electronic device (e.g., the external electronic device 300); and transmit the audio signal to the second external electronic device by using the communication rights through the short range communication circuit 310.

According to various embodiments, the processor 390 may be configured to acquire at least a part of an audio signal transmitted to the electronic device from the second external electronic device through the short range communication circuit, on the basis of information related to the communication channel.

According to various embodiments, the processor 390 may be configured to acquire, from the first external electronic device, the rights transfer information in relation to a call function of the second external electronic device through the short range communication circuit, and to receive the communication rights of the first external electronic device transferred from the first external electronic device at least on the basis of the rights transfer information.

According to various embodiments, the processor 390 may be configured to acquire the rights transfer information when a request for using a microphone is identified, and to request and acquire the communication rights of the first external electronic device from the first external electronic device at least on the basis of the rights transfer information.

According to various embodiments, the processor 390 may be configured to transmit data received at the first external electronic device and an audio signal acquired through the microphone to the second external electronic device through the short range communication circuit.

As described above, the electronic device 101 according to various embodiments may include a short range communication circuit (e.g., the wireless communication module 192 and the processor 120, wherein the processor 120 may be configured to: establish a communication channel with the first external electronic device (e.g., the external electronic device 400) by using a designated communication scheme through the short range communication circuit 192; confirm an acquisition request of an audio signal by using the microphone 355 functionally connected with a second external electronic device (e.g., the external electronic device 300); and, at least on the basis of the confirmed request, transmit an instruction, which allows the second external electronic device to acquire communication rights of the first external electronic device, to the first external electronic device so that the second external electronic device communicates with the electronic device 101 to transmit an external audio signal acquired through the microphone.

As described above, an electronic device according to various embodiments (e.g., an observer device, for example, the external electronic device 300 of FIG. 3) may include a short range communication circuit (e.g., the communication circuit 310), a microphone 355, and the processor 390, wherein the processor 390 is configured to: receive information related to a communication channel connected between a first external electronic device (e.g., a primary device, for example, the external electronic device 400) and a second external electronic device (e.g., an audio source device, for example, the electronic device 101) from the first external electronic device by using a designated communication scheme through the short communication circuit 310; confirm reception of designated data from the first external electronic device; and when reception of the designated data is confirmed, transmit the received designated data and audio data acquired through the microphone to the second external electronic device through the short range communication circuit.

According to various embodiments, the processor 390 may be configured to allow the electronic device to operate as a primary device, at least on the basis of reception of the designated data from the first external electronic device.

According to various embodiments, the processor 390 may be configured to: at least on the basis of reception of the designated data from the first external electronic device, receive communication rights that enables communication with the second external electronic device; and communicate with the second external electronic device by using the designated communication scheme, at least on the basis of reception of the transferred communication rights.

According to various embodiments, the designated data may be configured to include information related to a reception state of an audio signal received from the second external electronic device by the first external electronic device.

According to various embodiments, the processor 390 may be configured to determine a response signal at least on the basis of information related to the reception state of the audio signal received from the first external electronic device and the reception state of the audio signal received from the second external electronic device by the electronic device, and transmit the determined response signal to the second external electronic device.

Hereinafter, an operation method according to various embodiments of the present disclosure will be described with reference to accompanying drawings. However, since various embodiments of the present disclosure are not restricted or limited by the following description, it should be noted that application of various embodiments is available based on the various embodiments described below. Hereinafter, various embodiments of the present disclosure will be described based on an approach of hardware. However, various embodiments of the present disclosure include a technology that uses both hardware and software and thus, the various embodiments of the present disclosure may not exclude the perspective of software.

Establishing Communication Channel and Observer Role

Figure 5:
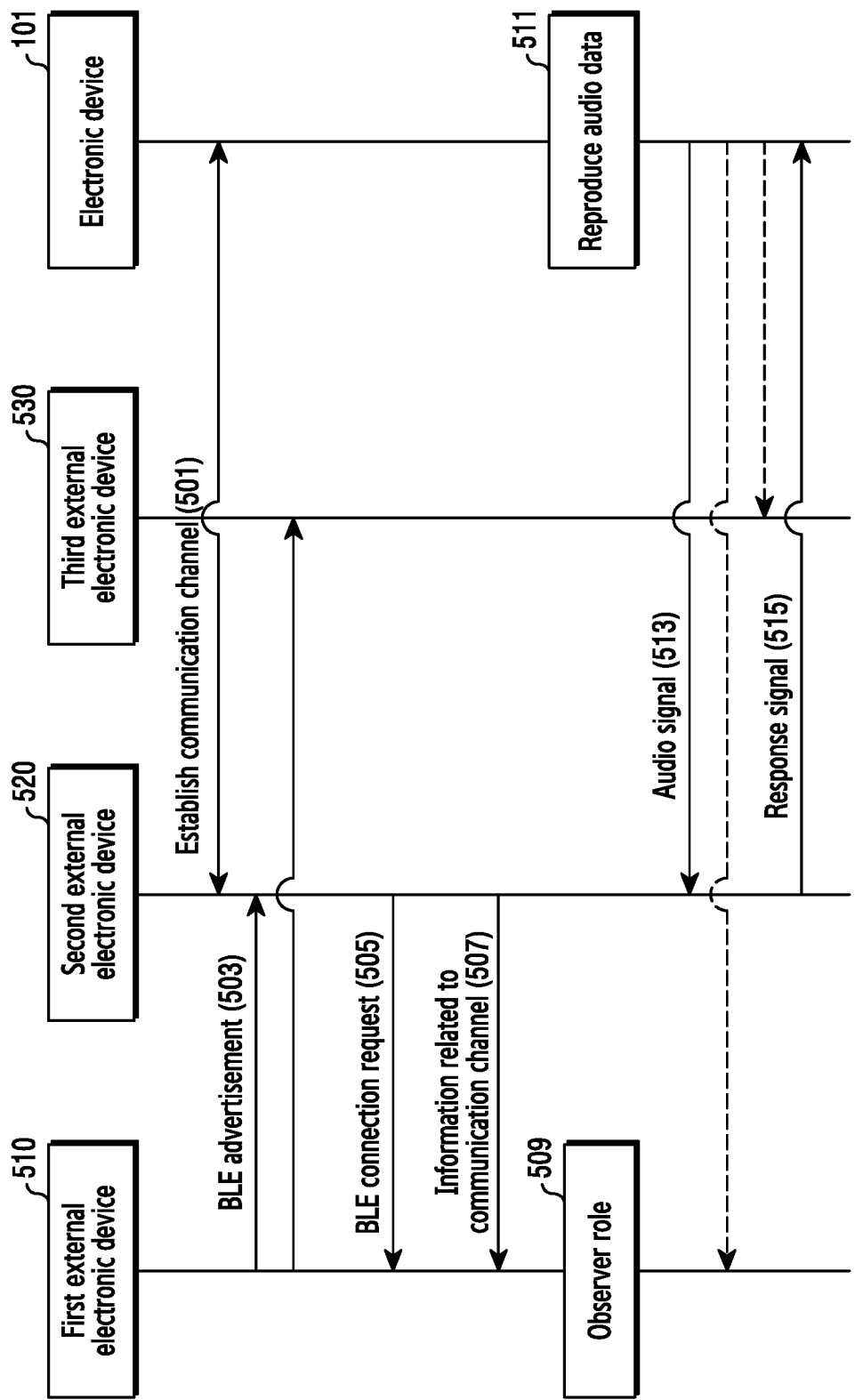
FIG. 5 is a diagram for describing a method for establishing a communication channel between electronic devices to perform communication therebetween in a system according to various embodiments.

FIG. 5 is a diagram for describing a method for establishing a communication channel between electronic devices to perform communication therebetween in a system according to various embodiments of the present disclosure.

A system according to various embodiments may include the electronic device 101, a first external electronic device 510, a second external electronic device 520, and a third external electronic device 530.

According to an embodiment, the electronic device 101 may be an audio source device that provides an audio signal generated by the electronic device 101 to external electronic devices. According to embodiment, the first external electronic device 510 may be a microphone device. According to an embodiment, the second external electronic device 520 and the third external electronic device 530 may be speakers, although other embodiments can include any combination of the first, second, and third external electronic devices with two speakers and a microphone.

According to various embodiments, the speakers may be classified as a second external electronic device 520 and a third external electronic device 530 according to a role (or operation) thereof. According to an embodiment, the second external electronic device 520 may be a left speaker device (e.g., a left earbud) that outputs (or reproduces) one channel (e.g., a left channel) of an audio signal, and the third external electronic device 530 may be a right speaker device (e.g., a right earbud) that outputs (or reproduces) another channel (e.g., a right channel) of the audio signal. According to various embodiments, the second external electronic device 520 and/or the third external electronic device 530 may be implemented as a speaker that outputs all stereo channels.

According to various embodiments, one primary device (e.g., the second external electronic device 520) that directly transfers data to the electronic device 101 or establishes and maintains a communication channel with the electronic device 101 in a designated communication scheme (e.g., Bluetooth communication), and one or more observer devices (e.g., the first external electronic device 510 or the third external electronic device 530) may be provided.

Referring to FIG. 5, in operation 501, the electronic device 101 and the second external electronic device 520 that is a primary device may be in a state where a communication channel has been established therebetween in a designated communication scheme (e.g., Bluetooth communication). For example, in FIG. 5, the second external electronic device 520 may perform a primary role, and the third external electronic device 530 may perform an observer role. According to an embodiment, the first external electronics 510 may be in a state before being included in the system (e.g., an off state or a disconnected state from a primary device).

In operation 503, the first external electronic device 510 may scan (search) for the primary device in response to entering the system (e.g., entering a communication available range, turning on (or booting) a device within the range or triggering by a user, etc.) According to an embodiment, the first external electronic device 510 may broadcast an advertisement packet after booting in order to search for the primary device. For example, the first external electronic device 510 may start a BLE advertisement. Although not illustrated in FIG. 5, the third external electronic device 530 may also search for and identify (or recognize) the second external electronic device 520 that is the primary device through operation corresponding to the first external electronic device 510, and the third external electronic device 530 may be in a BLE connected state.

According to an embodiment, the first external electronic device 510 may correspond to a peripheral device of the second external electronic device 520 that operates as a primary device (or a central device), and the first external electronic device 510 may periodically or aperiodically transmit a signal (e.g., an advertisement packet) to enable the primary device to find the first external electronic device 510. According to an embodiment, an operation of periodically transmitting a signal by a peripheral device is referred to as advertising (or posting), and an operation of reading, by a central device, a signal transmitted by a peripheral device is referred to as access or search (observation). According to an embodiment, the first external electronic device 510 may transmit (e.g., corresponding to aperiodic transmission) a signal (e.g., an advertisement packet) on the basis of interrupt, such as turning on power. According to an embodiment, when information (e.g., address information, etc.) of an external electronic device to be connected (e.g., a primary device, for example, the second external electronic device 520) is known, the first external electronic device 510 may immediately perform connection request, such as operation 505 to be described later, on the basis of power of the first external electronic device 510 being turned on.

In operation 505, the second external electronic device 520 may transmit a BLE connection request to the first external electronic device 510. For example, in response to reception of a BLE advertisement packet of the first external electronic device 510, the second external electronic device 520 operating as a primary device may transmit the BLE connection request to the first external electronic device 510, and may establish a communication channel in a designated communication scheme (e.g., BLE communication). According to an embodiment, in a case of the third external electronic device 530 operating as an observer device, the BLE connection request may not be performed regardless of reception of the BLE advertisement packet. According to an embodiment, in response to BLE advertisement packet broadcast, the first external electronic device 510 may determine (or identify) a device that performs as a primary device, on the basis of the connection request received from the primary device.

In operation 507, when a communication channel with the first external electronic device 510 is established in a designated communication scheme (e.g., BLE communication), the second external electronic device 520 that is the primary device may transmit, to the first external electronic device 510, information related to a communication channel established in the designated communication scheme (e.g., Bluetooth communication) between the second external electronic device 520 and the electronic device 101.

In operation 509, the first external electronic device 510 may perform an observer role. For example, the first external electronic device 510 may operate as an observer device and may start sniffing for acquiring an audio signal by using information related to the communication channel. According to an embodiment, the first external electronic device 510 may acquire an audio signal in a sniffing scheme, the audio signal being reproduced in the electronic device 101 and transmitted to the second external electronic device 520 that is the primary device. According to an embodiment, when the first external electronic device 510 is a microphone device, the acquired audio signal may not be output (or reproduced). According to an embodiment, the first external electronic device 510 may transmit, in the designated communication scheme (e.g., BLE communication), a response signal (e.g., an ACK signal or an NACK signal) related to the acquired audio signal to a first device 400A that is a primary device.

In various embodiments, operation 505, operation 507, and operation 509 are not limited to the above described sequence of operations, but may be performed sequentially, in parallel, in reverse sequence, or heuristically.

In operation 511, the electronic device 101 may reproduce audio data. According to an embodiment, when the electronic device 101 is in a state of having been reproducing audio data, operation 511 may be omitted.

In operation 513, the electronic device 101 may reproduce (or output) an audio signal (continuously when the electronic device 101 has been reproducing the audio signal). As illustrated in FIG. 5, the audio signal reproduced by the electronic device 101 may be transmitted to the second external electronic device 520 that is the primary device with which the communication channel is established in the designated communication scheme (e.g., Bluetooth communication). An audio signal may be acquired in a sniffing scheme by the first external electronic device 510 and the third external electronic device 530 which are observer devices. For example, the first external electronic device 510 and the third external electronic device 530 may access the communication channel established between the electronic device 101 and the second external electronic device 520 by using information related to the communication channel, which is acquired from the second external electronic device 520, and may acquire, in a sniffing scheme, the audio signal transmitted from the electronic device 101 to the second external electronic device 520.

In operation 515, the second external electronic device 520 that is the primary device may transmit a response signal (e.g., an ACK signal or an NACK signal) related to the received audio signal to the electronic device 101 in the designated communication scheme (e.g., Bluetooth communication). According to an embodiment, the second external electronic device 520 may combine information on whether the observer device (e.g., the first external electronic device 510 and the third external electronic device 530) has received an audio packet with the information on whether the second external electronic device 520 itself has received the audio packet and, when at least one device has failed to receive the audio packet, the second external electronic device 520 may transmit a response signal to the electronic device 101 to enable the corresponding audio packet to be retransmitted. For example, the primary device may transmit, to the electronic device 101, a response signal indicating whether the audio signal has been successfully received, through the communication channel established between the primary device and the electronic device 101. According to an embodiment, the primary device may transmit an ACK signal to the electronic device 101 when all external electronic devices have successfully received the audio signal, and may transmit an NACK signal to the electronic device 101 when even one external electronic device has failed to receive the audio signal.

Switching Observer and Primary Roles Between Electronic Devices

Figure 6:
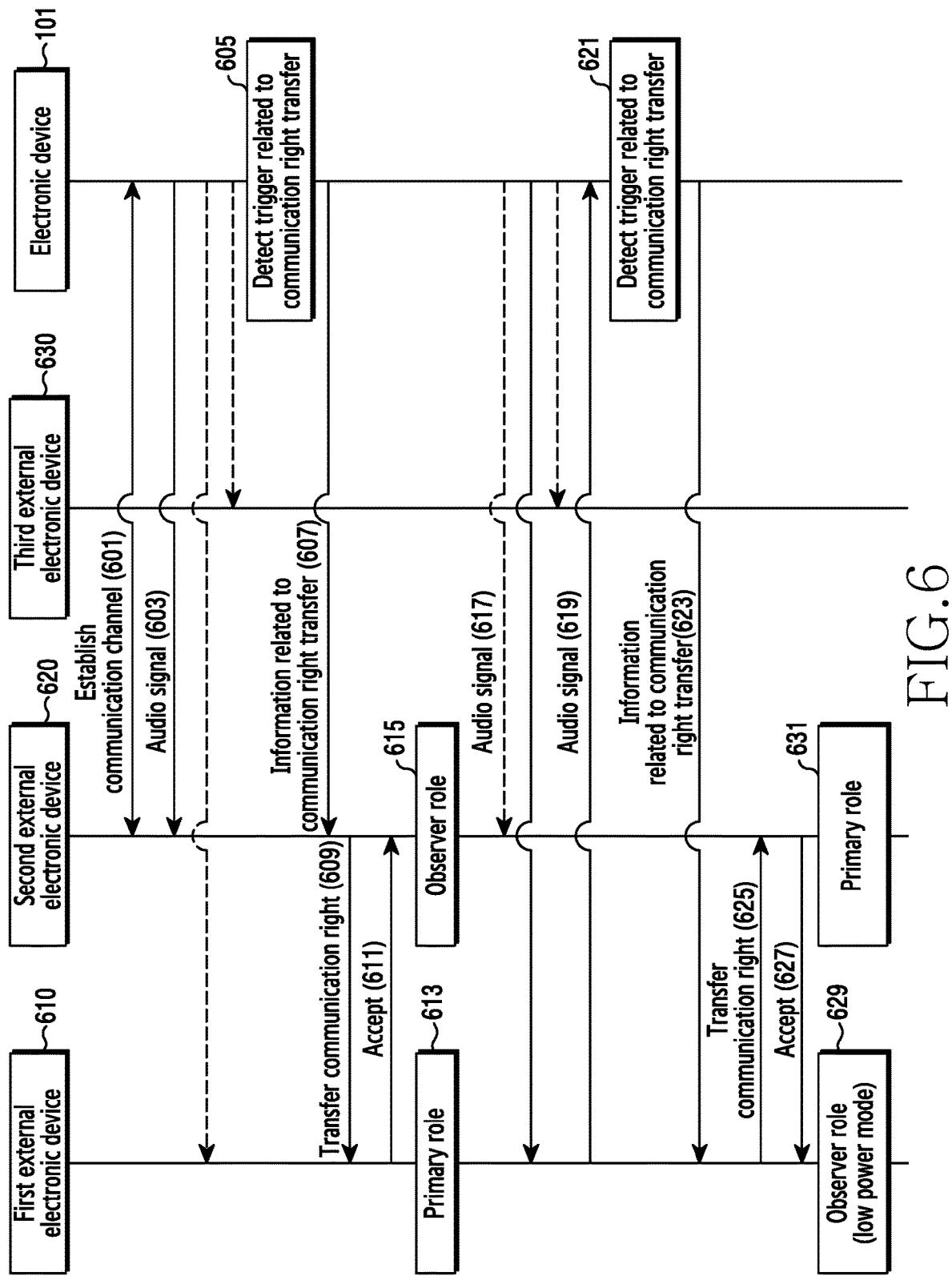
FIG. 6, FIG. 7, and FIG. 8 are diagrams for describing a method for changing roles between electronic devices in a system according to various embodiments.

FIG. 6 is a diagram for describing a method for changing roles between electronic devices in a system according to various embodiments of the present disclosure.

As shown in the description with reference to FIG. 5, FIG. 6 may illustrate performing operations in a state where one primary device and two observer devices are provided on the basis of external electronic devices. For example, a second external electronic device 620 may perform a primary role, and a first external electronic device 610 and a third external electronic device 630 may perform an observer role.

In various embodiments, the electronic device 101, the first external electronic device 610, the second external electronic device 620, and the third external electronic device 630 may mutually exchange device identification information (e.g., an identifier indicating a device type, a configured (allocated) role of a device, etc.) of other devices, and may mutually identify other devices thereof.

According to an embodiment, as illustrated in operation 601, the second external electronic device 620 performing a primary role may be in a state where a communication channel with the electronic device 101 has been established in a designated communication scheme. According to an embodiment, as illustrated in operation 603, the second external electronic device 620 performing a primary role may be in a state of receiving an audio signal reproduced in the electronic device 101. According to an embodiment, as illustrated in operation 603, the first external electronic device 610 and the third external electronic device 630 which perform an observer role may be in a state of receiving (e.g., acquiring in a sniffing scheme) the audio signal reproduced in the electronic device 101 on the basis of information related to the communication channel, which is acquired from the second external electronic device 620 that is a primary device.

According to various embodiments, the primary device may transfer, as necessary, a primary role to one of observer devices through a rights transfer procedure. In various embodiments, an associated procedure for communication rights transfer may be initiated (start) by at least some of the primary device, the observer devices, and the electronic device 101. In FIG. 6, operations of detecting a trigger for transferring communication rights and determining a device for a primary role so as to transfer a rights of a primary device to the determined device, in the electronic device 101, will be described.

Referring to FIG. 6, in operation 605, the electronic device 101 may detect a trigger related to communication rights transfer. In various embodiments, the trigger related to the communication rights transfer may be classified as a first trigger (or an internal trigger) determined (or detected) by the electronic device 101 and a second trigger (or an external trigger) generated by a request of an external electronic device (e.g., a primary device). In various embodiments, the first trigger and the second trigger may be distinguished, with reference to an operation subject (e.g., a corresponding device processing communication rights transfer) that processes communication rights transfer, on the basis of whether the triggers are detected or processed by the operation subject, or the operation subject receives a request from outside (e.g., another device). According to an embodiment, another device may be an external electronic device (e.g., a primary device) when the operation subject is the electronic device 101, and another device may be a different external electronic device and/or electronic device when the operation subject is the external electronic device 610, 620, or 630.

According to an embodiment, the first trigger may be detected at least based on reception of a call from another external electronic device by the electronic device 101, or a call origination request of a user of the electronic device 101. For example, when a call reception request of the another external electronic device is detected (or when a call origination request of a user is detected), the electronic device 101 may identify a currently configured primary device, and when the identified primary device is not a microphone device (e.g., a case of a speaker device), the electronic device 101 may determine the call reception request or call origination request as occurrence of a trigger in order to allow the microphone device to perform a primary role to receive a user voice signal through the microphone device.

According to an embodiment, the first trigger may be detected at least based on a state change of the primary device (e.g., the second external electronic device 620) and/or a state change of the electronic device 101. For example, the electronic device 101 may acquire (or receive) state information (e.g., a battery state, an on/off state, a sleep state, etc.) related to the primary device and the observer devices from a corresponding device. The electronic device 101 may determine whether there have been changes in a role of the primary device, at least partially based on the state information of the devices. According to an embodiment, the electronic device 101 may determine that a trigger has occurred, in response to a power-off entry detection (e.g., a power-off request detection by a user, a minimum battery level detection prior to entering power-off, etc.) of the primary device or a detection of a change into a sleep state. According to embodiment, the electronic device 101 may determine that a trigger has occurred, in response to detecting that a battery state of the primary device is lower than a preset reference level.

According to an embodiment, the second trigger may be detected at least based on a request of the primary device (e.g., the second external electronic device 620). According to an embodiment, the primary device may transmit, at least on the basis of switching a state thereof to a power-off state or a sleep state, associated state information to the electronic device 101, by which the electronic device 101 may determine that a trigger has occurred and may allow the primary device (e.g., e.g., the second external electronic device 620) to transfer communication rights. According to another embodiment, in a case where the primary device is the second external electronic device 620, when a user listens to music, a state of the second external electronic device 620 may be switched to a sleep state in order to reduce power consumption of the second external electronic device 620 that is not in use. The primary device (e.g., the second external electronic device 620) may transmit, at least on the basis of sleep state switching thereof, associated state information to the electronic device 101, by which the electronic device 101 may determine that a trigger has occurred and may allow the primary device (e.g., the second external electronic device 620) to transfer the communication rights. According to various embodiments, the current primary device may determine one of observer devices, as a primary device to which the communication rights is to be transferred, on the basis of receiving, from the electronic device 101, information related to the communication rights transfer.

According to an embodiment, the second trigger may be detected at least based on a request of an observer device (e.g., the first external electronic device 610). According to various embodiments, the observer device (e.g., the first external electronic device 610) may transfer a request to the electronic device 101 through the primary device (e.g., the second external electronic device 620). According to an embodiment, when a type of the observer device is a microphone device like the first external electronic device 610, and a user command needs to be processed (e.g., a scenario for receiving a user voice signal for a voice recognition function, etc.) the observer device (e.g., a microphone device) may request a rights transfer from the primary device, and the primary device may transfer (e.g., forward) the request of the observer device to the electronic device 101. According to an embodiment, the electronic device 101 may determine the request of the observer device (e.g., a microphone device) through the primary device, as occurrence of a trigger for the communication rights transfer.

In operation 607, the electronic device 101 may transmit information related to the communication rights transfer (or a request to transfer communication rights), to the second external electronic device 620 that is the primary device. The electronic device 101 may generate, in response to detection of a trigger, information related to the communication rights transfer at least on the basis of the detected trigger. The electronic device 101 may transfer information related to the communication rights transfer to the second external electronic device 620 for which the communication channel has been established in the designated communication scheme.

According to an embodiment, the information related to the communication rights transfer may include first information used for requesting the primary device to transfer a primary role to one of observer devices. In this case, determining one device, to which a primary role is to be transferred, from among the observer devices may be provided.

According to an embodiment, the information related to the communication rights transfer may include, in addition to the first information, second information related to a target device to be designated as a primary device by the electronic device 101. In this case, the primary device may determine the target device from among neighboring observer devices on the basis of the second information.

According to an embodiment, the information related to the communication rights transfer may include, in addition to the first information, third information related to a trigger type so as to enable the primary device to determine a target device to which the communication rights is required to be transferred. According to an embodiment, the third information may be information notifying that the communication rights transfer is based on call reception of the electronic device 101. The primary device may determine, based on the third information, an observer device corresponding to the trigger type from among the neighboring observer devices and may determine a corresponding observer device as a target device.

According to various embodiments, the information related to the communication rights transfer may be provided including the above described first information, second information, and third information, including at least a part of the first information, the second information, and the third information, or including other information for each trigger scheme related to the communication rights transfer.

In some embodiments, the electronic device 101 may also send a request to one of the external electronic devices, e.g., 610, having an observer role, to receive the communication rights transfer.

In operation 609, the external electronic device 620 may transfer the communication rights to the target device in response to receiving, from the electronic device 101, information related to the communication rights transfer. According to an embodiment, in a case where the target device is the first external electronic device 610, the second external electronic device 620 may transfer the communication rights to the first external electronic device 610. For example, the second external electronic device 620 may transfer a related instruction such that the first external electronic device 610 operates as the primary device. In various embodiments, the communication rights transfer may correspond to a procedure of transferring a role of the primary device to one observer device from among observer devices within the system. According to an embodiment, the communication rights transfer may be initiated by the primary device, and when the communication rights transfer is completed, the previous primary device may be switched to an observer device.

In operation 611, the first external electronic device 610 may transmit an accept signal for agreement to the second external electronic device 620 in response to receiving the communication rights transfer from the second external electronic device 620. According to an embodiment, operation 611 may not be performed.

In operation 613, the first external electronic device 610 may perform a primary role in response to receiving the communication rights transfer from the second external electronic device 620 that is the primary device. According to an embodiment, the first external electronic device 610 may perform switching from an observer role to a primary role.

In operation 615, the second external electronic device 620 may perform an observer role in response to completion of the communication rights transfer to the first external electronic device 610. According to an embodiment, the second external electronic device 620 may perform switching from a primary role to an observer role.

According to various embodiments, operation 613 and operation 615 are not limited to the above described sequence of operations, but may be performed sequentially, in parallel, in reverse sequence, or heuristically.

As shown in operation 613 and operation 615, in accordance with a change in the primary device, as illustrated in operation 617, an audio signal reproduced (or output) by the electronic device 101 may be transferred to the first external electronic device 610 that is the changed primary device, and the second external electronic device 620 and the third external electronic device 630 may acquire the audio signal reproduced by the electronic device 101, by using information related to the communication channel.

In operation 619, the first external electronic device 610 may transmit the audio signal to the electronic device 101 through the designated communication scheme (e.g., Bluetooth communication). According to an embodiment, it may be possible that the first external electronic device 610 communicates (e.g., bidirectional communication) with the electronic device 101 on the basis of the designated communication scheme, in accordance with the change to the primary device due to the communication rights transfer. The first external electronic device 610 may transfer, on the basis of receiving an audio signal (e.g., a voice signal) from a user, the audio signal (e.g., a voice signal) to the electronic device 101 by using the designated communication scheme.

In operation 621, the electronic device 101 may detect a trigger related to the communication rights transfer. The trigger related to the communication rights transfer may correspond to the description provided with reference to the above described operation 605. According to an embodiment, in description of FIG. 6, the electronic device 101 may detect termination of a call function that has been performed according to call reception or call origination, the electronic device 101 may detect termination of a voice recognition function, or the first external electronic device 610 may determine occurrence of a trigger on the basis of detecting termination of use by a user. According to an embodiment, when the first external electronic device 610 detects termination of use by the user, the first external electronic device 610 may transfer a trigger related to termination of use to the electronic device 101 through the second external electronic device 620 that is the primary device.

In operation 623, the electronic device 101 may transfer information related to communication rights transfer to the first external electronic device 610 that is the primary device. The electronic device 101 may transfer, in response to detecting the trigger, the information related to the communication rights transfer to the first external electronic device 610 by using the designated communication scheme.

In operation 625, the first external electronic device 610 may transfer the communication rights to a target device in response to receiving, from the electronic device 101, the information related to the communication rights transfer. According to an embodiment, in a case where the target device is the second external electronic device 620, the first external electronic device 610 may transfer the communication rights to the second external electronic device 620. For example, the first external electronic device 610 may transfer an associated instruction indicating to change a role of the second external electronic device 620 to a primary role.

In operation 627, the second external electronic device 620 may transmit an accept signal for agreement to the first external electronic device 610 in response to receiving the communication rights transfer from the first external electronic device 610. According to an embodiment, operation 627 may not be performed.

In operation 629, the first external electronic device 610 may perform an observer role in response to completion of the communication rights transfer to the second external electronic device 620. According to an embodiment, the first external electronic device 610 may perform switching from a primary device to an observer device. According to an embodiment, the first external electronic device 610 may operate in a low-power mode. According to an embodiment, since the first external electronic device 610 is neither required to receive a user voice nor required to output an audio signal due to characteristics thereof, the first external electronic device 610 may be configured to enter the low-power mode upon switching to an observer device.

In operation 631, the second external electronic device 620 may perform a primary role in response to receiving the communication rights transfer from the first external electronic device 610 that is the primary device. According to an embodiment, the second external electronic device 620 may perform switching from an observer device to a primary device.

Figure 7:
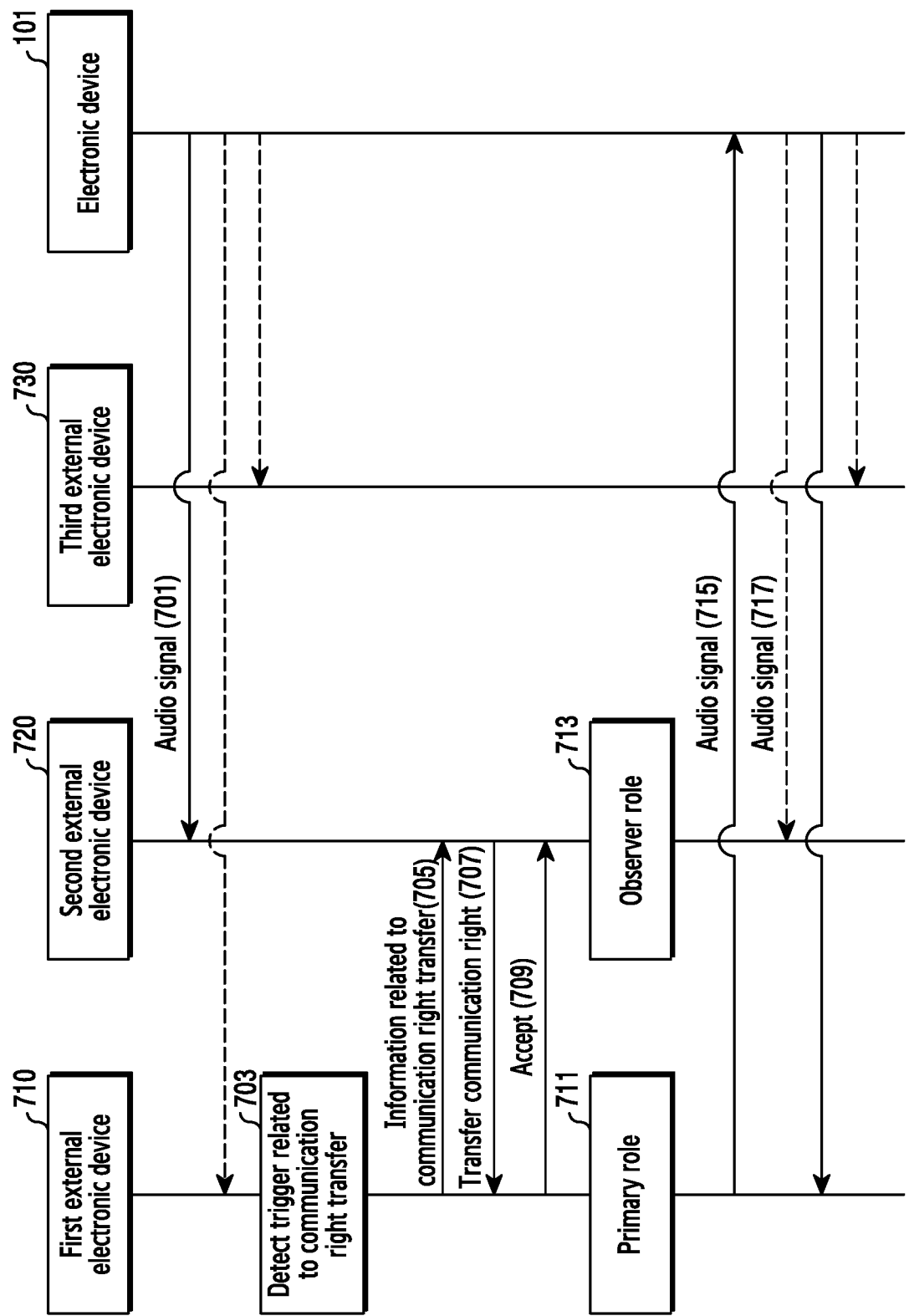

FIG. 7 is a diagram for describing a method for changing roles between electronic devices in a system according to various embodiments of the present disclosure.

In FIG. 7, the electronic device 101 and a second external electronic device 720 may be in a state where a first communication channel has been established therebetween in a designated communication scheme (e.g., Bluetooth communication). For example, in FIG. 7, the second external electronic device 720 may operate as a primary device, wherein a first external electronic device 710 and a third external electronic device 730 are in a state where a second communication channel with the second external electronic device 720 has been established in a designated communication scheme (e.g., BLE communication), and the first external electronic device 710 and the third external electronic device 730 operate as observer devices. In the description of FIG. 7, the first external electronic device 710 corresponds to the first audio device 300 (e.g., a microphone device), and the second external electronic device 720 and the third external electronic device 730 correspond to the second audio device 400 (e.g., speaker device). FIG. 7 may describe an example wherein the first external electronic device 710 operating as an observer device receives communication rights transferred from the primary device in response to detecting a trigger related to communication rights transfer and operates according thereto.

Referring to FIG. 7, in operation 701, the electronic device 101 may transfer an audio signal to the second external electronic device 720 that is the primary device through the first communication channel of the designated communication scheme (e.g., Bluetooth communication). In operation 701, the first external electronic device 710 and the third external electronic device 710 that are observer devices may acquire, in a sniffing scheme, the audio signal transmitted from the electronic device 101 to the second external electronic device 720 through the first communication channel, by using information related to the communication channel.

In operation 703, the first external electronic device 710 may detect a trigger related to the communication rights transfer. In various embodiments, the trigger related to the communication rights transfer may be classified as a first trigger (or an internal trigger) determined (or detected) by the first external electronic device 710 and a second trigger (or an external trigger) by a request of the primary device.

According to an embodiment, the first external electronic device 710 may determine that a first trigger has occurred when the first external electronic device 710 has to process a user command in response to triggering by a user (e.g., a scenario for receiving a user voice signal for voice recognition function, etc.). According to an embodiment, the first external electronic device 710 may determine that a second triggering has occurred at least on the basis of a request related to the communication rights transfer, which is transmitted from the primary device (e.g., the second external electronic device 720).

In operation 705, the first external electronic device 710 may transmit the information related to the communication rights transfer to the second external electronic device 720 that is the primary device through the second communication channel. According to an embodiment, in response to detection of a trigger, the first external electronic device 710 may generate the information related to the communication rights transfer at least on the basis of the detected trigger. The first external electronic device 710 may transfer the information related to the communication rights transfer to the second external electronic device 720 through the second communication channel. According to an embodiment, the information relating to the communication rights transfer may include information used for requesting to transfer the communication rights of the second external electronic device 720 so as to enable the first external electronic device 710 to communicate with the electronic device 101.

In operation 707, the second external electronic device 720 may transmit the communication rights to the first external electronic device 710 in response to receiving, from the first external electronic device 710, the information relating to the communication rights transfer. According to an embodiment, the second external electronic device 720 may transfer an associated instruction to enable the first external electronic device 710 to operate as a primary device.

In operation 709, the first external electronic device 710 may transmit an accept signal for agreement to the second external electronic device 720 through the second communication channel in response to receiving the communication rights transfer from the second external electronic device 720. According to an embodiment, operation 709 may not be performed.

In operation 711, the first external electronic device 710 may perform a primary role in response to receiving the communication rights transfer from the second external electronic device 720 that is the primary device. According to an embodiment, the first external electronic device 710 may perform switching from an observer role to a primary role.

In operation 713, the second external electronic device 720 may perform an observer role in response to completion of the communication rights transfer to the first external electronic device 710. According to an embodiment, the second external electronic device 720 may perform switching from a primary role to an observer role.

According to various embodiments, operation 711 and operation 713 are not limited to the above described sequence of operations, but may be performed sequentially, in parallel, in reverse sequence, or heuristically. For example, roles of the first external electronic device 710 and the second external electronic device 720 may be switched based on completion of a procedure related to the communication rights transfer.

In operation 715, the first external electronic device 710 may transmit the audio signal to the electronic device 101. According to an embodiment, it may be possible that the first external electronic device 710 transmits the audio signal to the electronic device 101 through the first communication channel of the designated communication scheme (e.g., Bluetooth communication), in accordance with the change to the primary device due to the communication rights transfer. According to an embodiment, on the basis of receiving an audio signal (e.g., a voice signal) from a user through a microphone, the first external electronic device 710 may transmit the audio signal (e.g., a voice signal) to the electronic device 101 through the first communication channel.

In operation 717, the electronic device 101 may transmit the audio signal to the first external electronic device 710 that is the primary device through the first communication channel of the designated communication scheme (e.g., Bluetooth communication). In operation 717, the second external electronic device 720 and the third external electronic device 730 which are observer devices may acquire, in a sniffing scheme, the audio signal transmitted from the electronic device 101 to the second external electronic device 720 through the first communication channel, by using the information related to the communication rights transfer.

In various embodiments, operation 715 and operation 717 are not limited to the above sequence of operations, but may be performed sequentially, in parallel, in reverse sequence, or heuristically.

Figure 8:
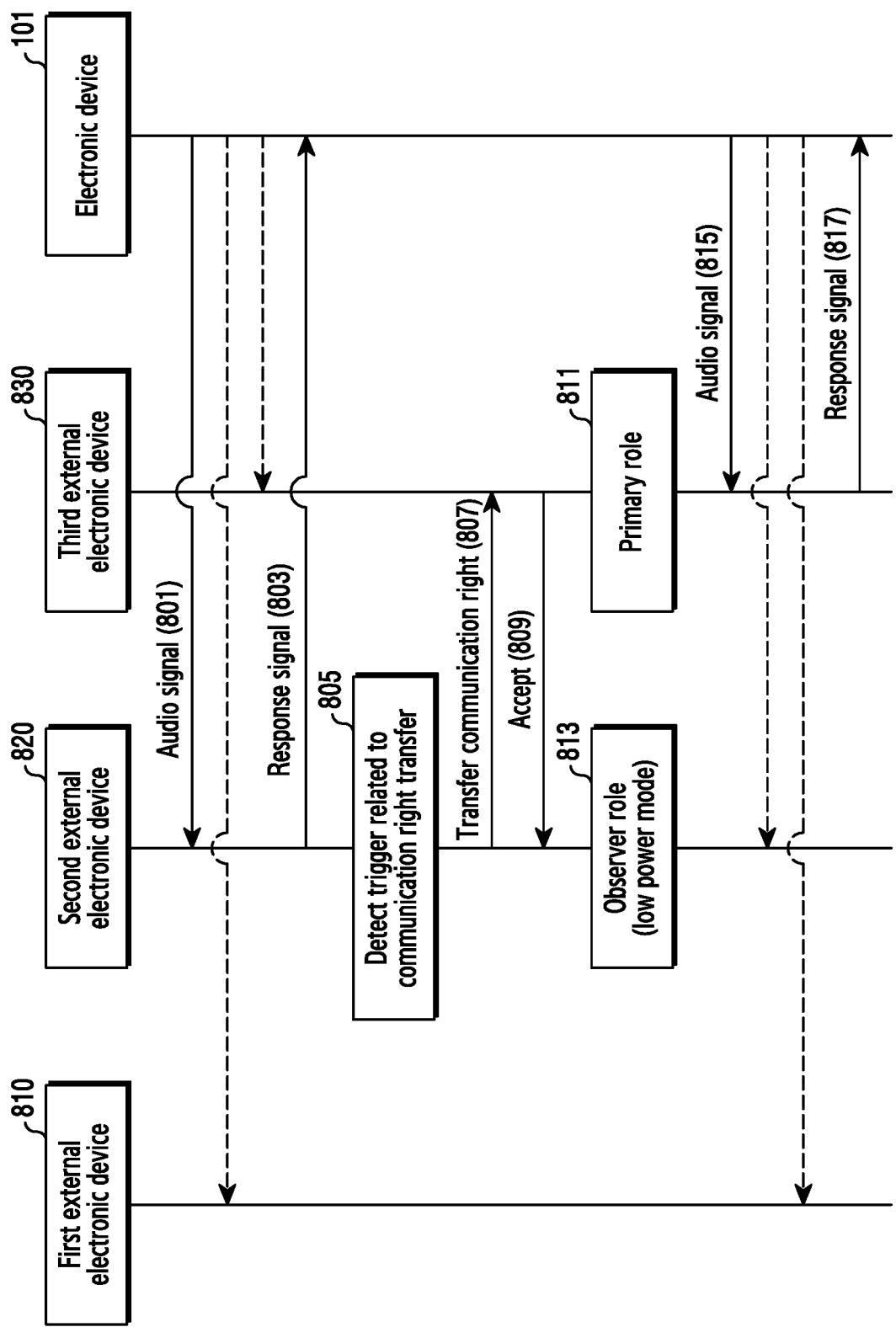

FIG. 8 is a diagram for describing a method for changing roles between electronic devices in a system according to various embodiments of the present disclosure.

In FIG. 8, the electronic device 101 and a second external electronic device 820 may be in a state where a first communication channel has been established therebetween in a designated communication scheme (e.g., Bluetooth communication). For example, in FIG. 8, the second external electronic device 820 may operate as a primary device, wherein a first external electronic device 810 and a third external electronic device 830 are in a state where a second communication channel with the second external electronic device 820 has been established in a designated communication scheme (e.g., BLE communication), and operate as observer devices. In the description of FIG. 8, the first external electronic device 810 corresponds to the first audio device 300 (e.g., a microphone device), and the second external electronic device 820 and the third external electronic device 830 correspond to the second audio device 400 (e.g., speaker device). FIG. 8 may describe an example of transferring communication rights from an observer device in response to detecting a trigger relating to communication rights transfer in the second external electronic device 820 operating as a primary device.

Referring to FIG. 8, in operation 801, the electronic device 101 may transmit an audio signal to the second external electronic device 820 that is the primary device through the first communication channel of the designated communication scheme (e.g., Bluetooth communication). In operation 801, the first external electronic device 810 and the third external electronic device 830 which are observer devices may acquire, in a sniffing scheme, the audio signal transmitted from the electronic device 101 to the second external electronic device 820 through the first communication channel, by using information related to the communication channel.

In operation 803, the second external electronic device 820 that is the primary device may transmit a response signal (e.g., an ACK signal or an NACK signal) related to the audio signal to the electronic device 101.

In operation 805, the second external electronic device 820 may detect a trigger related to the communication rights transfer. In various embodiments, the trigger related to the communication rights transfer may be classified as a first trigger (or an internal trigger) determined (or detected) by the second external electronic device 820 and a second trigger (or an external trigger) by a request of the electronic device 101.

According to an embodiment, the second external electronic device 820 may determine that a first trigger has occurred at least on the basis of a state change of the second external electronic device 820. For example, the second external electronic device 820 may determine that the first trigger has occurred in response to a power-off entry detection (e.g., a power-off request detection by a user, a minimum battery level detection prior to entering power-off, etc.) or a detection of a change into a sleep state. According to an embodiment, when it is determined that the first external electronic device 810 has to process a user command, on the basis of a request of the electronic device 101 (e.g., a scenario for receiving a user voice signal for a voice recognition function or a call function), the second external electronic device 820 may determine that the second trigger has occurred. According to an embodiment, the second external electronic device 820 may determine that the second trigger has occurred, at least on the basis of the request related to the communication rights transfer, which is transmitted from the electronic device 101.

In operation 807, the second external electronic device 820 may transfer the communication rights to the third external electronic device 830 that is one of observer devices through the second communication channel in response to detecting the trigger related to the communication rights transfer. According to an embodiment, as the second external electronic device 820 itself determines the communication rights transfer, the second external electronic device 820 may not transmit information related to the communication rights transfer. According to an embodiment, in response to detection of a trigger, the second external electronic device 820 may transfer the information related to the communication rights transfer to the third external electronic device 830 through the second communication channel at least on the basis of the detected trigger. According to an embodiment, the information related to the communication rights transfer may include information used for requesting to transfer the communication rights of the third external electronic device 830 so as to enable the third external electronic device 830 to communicate with the electronic device 101. According to an embodiment, FIG. 8 may describe an example of transferring the communication rights to the third external electronic device 830 that is a device of the same type (e.g., a speaker device), on the basis of a state change (e.g., switching to a sleep state) of the second external electronic device 820 that is a speaker device.

In operation 809, the third external electronic device 830 may transmit an accept signal for agreement to the second external electronic device 820 through the second communication channel in response to receiving the communication rights transfer from the second external electronic device 820. According to an embodiment, operation 809 may not be performed.

In operation 811, the third external electronic device 830 may perform a primary role in response to receiving the communication rights transfer from the second external electronic device 820 that is the primary device. According to an embodiment, the third external electronic device 830 may perform switching from an observer role to a primary role.

In operation 813, the second external electronic device 820 may perform an observer role in response to completion of the communication rights transfer to the third external electronic device 830. According to an embodiment, the second external electronic device 820 may perform switching from a primary role to an observer role.

In various embodiments, operation 811 and operation 813 are not limited to the above described operation sequence, but may be performed sequentially, in parallel, in reverse order, or heuristically. For example, roles of the second external electronic device 820 and the third external electronic device 830 may be switched based on completion of a procedure related to the communication rights transfer.

In operation 815, the electronic device 101 may transmit an audio signal to the third external electronic device 830 that is the primary device through the first communication channel of the designated communication scheme (e.g., Bluetooth communication). In operation 815, the second external electronic device 820 and the first external electronic device 810 which are observer devices may acquire, in a sniffing scheme, the audio signal transmitted from the electronic device 101 to the third external electronic device 830 through the first communication channel, by using information related to the communication channel.

In operation 817, the third external electronic device 830 that is the primary device may transmit a response signal (e.g., an ACK signal or an NACK signal) related to the audio signal to the electronic device 101.

Figure 9:
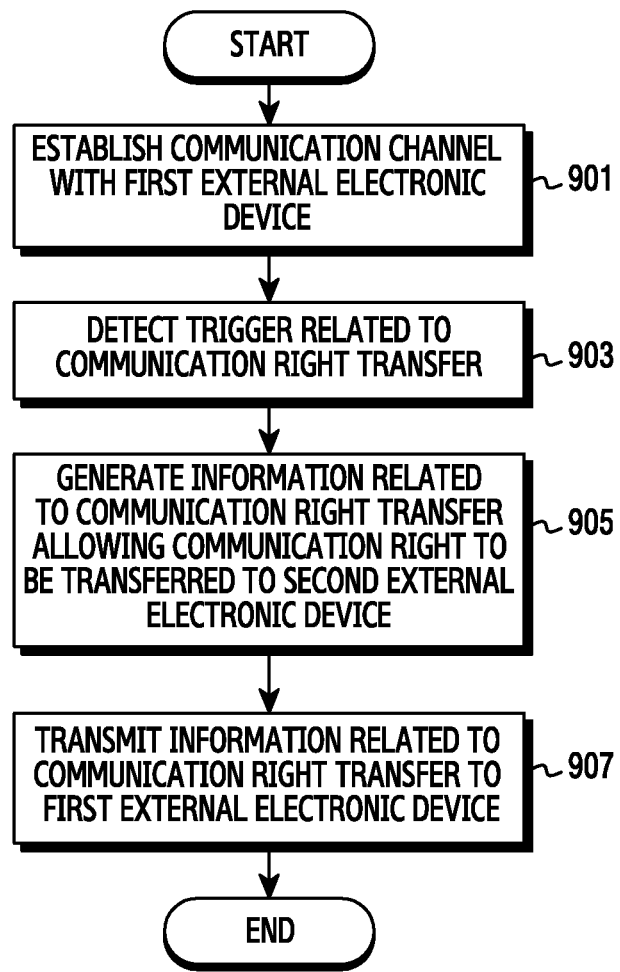
FIG. 9 is a flowchart illustrating an operation method of an electronic device according to various embodiments.

FIG. 9 is a flowchart illustrating an operation method of an electronic device according to various embodiments.

FIG. 9 may describe an example in which the electronic device 101 operating as an audio source device directs (or supports) a communication rights transfer between external electronic devices in response to a trigger related to the communication rights transfer.

Operation of Electronic Device

Referring to FIG. 9, in operation 901, the processor 120 (e.g., one or more processors including a processing circuit) of the electronic device 101 may establish (or initiate) a communication channel with a first external electronic device (e.g., a primary device) through a short range communication circuit (e.g., the wireless communication module 192). According to an embodiment, the processor 120 may establish a communication channel with one designated (or configured) external electronic device from among external electronic devices in a designated communication scheme (e.g., Bluetooth communication). For example, the processor 120 may be connected (e.g., paired) with the first external electronic device via Bluetooth communication for music transmission and a call. According to an embodiment, when connected via Bluetooth communication, the electronic device 101 and the first external electronic device may communicate with each other on the basis of a Bluetooth profile (e.g., an advanced audio distribution profile (A2DP), a hands-free profile (HFP), a headset profile (HSP), or the like) in which characteristics used for communication with a counterpart electronic device are specified.

In operation 903, the processor 120 may detect a trigger related to a communication rights transfer. According to an embodiment, the processor 120 may detect a trigger related to a change (e.g., a mode change) of a primary device. According to an embodiment, when a primary device is a speaker device, the processor 120 may determine to change a microphone device as the primary device in a case where it is necessary to acquire an audio signal (e.g., a voice signal) from the outside of the electronic device 101 (e.g., a user) (e.g., performing/detecting a call function or a voice recognition function, etc.). For example, the processor 120 may determine to allow the microphone device to operate as the primary device, when a request for acquiring an external audio signal (e.g., a voice signal) generated outside the electronic device 101 is determined (confirmed). According to an embodiment, the processor 120 may determine to change the primary device at least on the basis of a state change of the primary device (e.g., detecting a battery level equal to or lower than a reference level, detecting a change to a sleep state in a primary device, etc.).

In operation 905, the processor 120 may generate information related to the communication rights transfer that allows communication rights to be transferred to a second external electronic device so as to enable the electronic device 101 to communicate with the second electronic device (e.g., an external electronic device that is currently performing an observer role). According to an embodiment, the information related to the communication rights transfer may include an instruction that causes the second external electronic device (e.g., an observer device, for example, a microphone device) to acquire the communication rights so as to enable the second external electronic device to transmit an audio signal acquired from a user to the electronic device 101 by using the communication channel of the designated communication scheme (e.g., Bluetooth communication). For example, the processor 120 may direct the second external electronic device (e.g., an observer device) to operate as the primary device by transferring rights to the second external electronic device by the first external electronic device (e.g., a primary device).

In operation 907, the processor 120 may transmit the information related to the communication rights transfer to the first external electronic device. According to an embodiment, the processor 120 may transmit the information related to the communication rights transfer to the first external electronic device through the communication channel of the designated communication scheme (e.g., Bluetooth communication) by using the short range communication circuit.

Operation of Microphone that Receives Communication Rights

Figure 10:
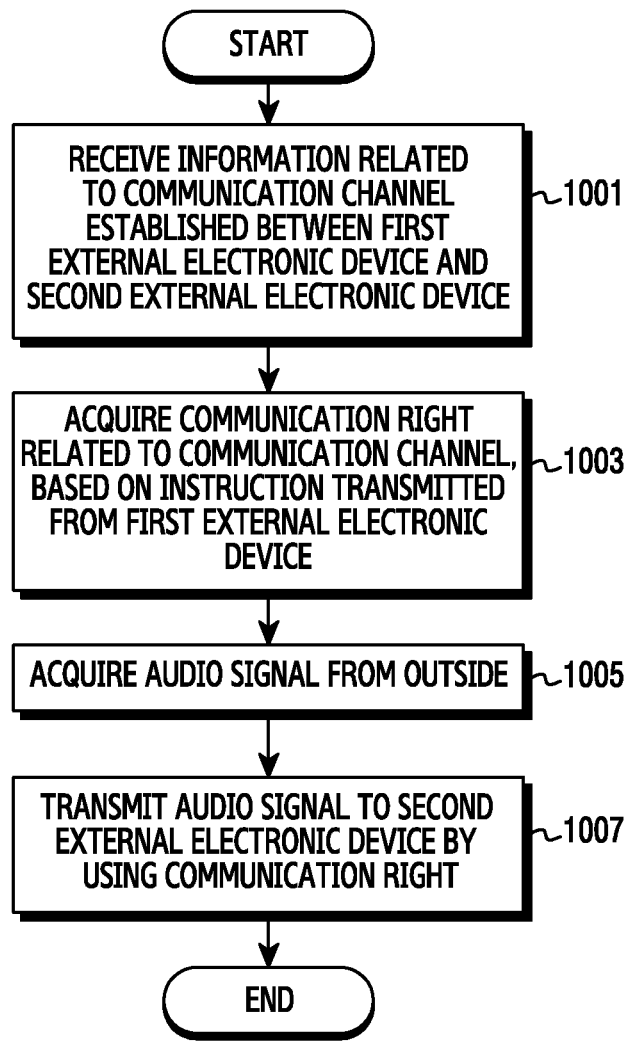
FIG. 10 is a flowchart illustrating an operation method of an external electronic device according to various embodiments.

FIG. 10 is a flowchart illustrating an operation method of an external electronic device according to various embodiments.

FIG. 10 may describe an example in which an external electronic device operating as an observer device from among external electronic devices operating as peripheral devices of the electronic device 101 performs operation using communication rights transferred from a primary device. Hereinafter, for the convenience of explanation, description is provided using an example in which the observer device is a microphone device. According to various embodiments, even if the observer device is a speaker device, operation corresponding to FIG. 10 may be performed by the speaker device.

For purposes of FIG. 10, the method can occur at 510, 610, 710, 810 and the first external electronic device corresponds to the electronic device 101.

Referring to FIG. 10, in operation 1001, the processor 390 (e.g., one or more processors including a processing circuit) of the electronic device (e.g., the external electronic device 300) may acquire (receive) information related to a communication channel connected (established) between a first external electronic device (e.g., a primary device) and a second external electronic device (e.g., an audio source device, for example, the electronic device 101). According to an embodiment, the processor 390 may acquire information related to the communication channel established between the first external electronic device and the second external electronic device from the first external electronic device (e.g., a primary device) by using a designated communication scheme (e.g., BLE communication) through a short range communication circuit. According to an embodiment, the processor 390 may acquire an audio signal transmitted from the second external electronic device to the first external electronic device through the corresponding communication channel by using the acquired information related to the communication channel. According to an embodiment, acquiring of the audio signal may include acquiring the audio signal by using a sniffing (or snooping) scheme.

In operation 1003, the processor 390 may acquire communication rights related to the communication channel on the basis of an instruction transmitted from the first external electronic device. According to an embodiment, the processor 390 may acquire, from the first external electronic device, the communication rights that enables communication (e.g., bidirectional communication) using the communication channel established between the first external electronic device and the second external electronic device, at least on the basis of the instruction transmitted from the first external electronic device in relation to a call received at the second external electronic device. According to an embodiment, the processor 390 may request the first external electronic device that is the primary device to transfer the communication rights, in response to detecting communication rights transfer-related trigger (e.g., an audio signal acquisition request using a microphone, for example, a voice recognition function execution command) from a user. The processor 390 may acquire the communication rights from the first external electronic device in response to requesting the communication rights transfer. According to an embodiment, the processor 390 may manage (or process) the electronic device to operate as the primary device, on the basis of acquiring the communication rights.

In operation 1005, the processor 390 may acquire an audio signal from the outside. According to an embodiment, the processor 390 may acquire an audio signal (e.g., a user voice signal) related to a call, by using a microphone functionally connected with the electronic device. According to an embodiment, the processor 390 may acquire an audio signal (e.g., a user voice signal) related to a voice recognition function by using the microphone functionally connected with the electronic device.

In operation 1007, the processor 390 may transmit an audio signal to the second external electronic device by using the communication rights. According to an embodiment, the processor 390 may transmit the audio signal to the second external electronic device through the communication channel of the designated communication scheme (e.g., Bluetooth communication) by using the short communication circuit. According to an embodiment, the processor 390 may identify the communication channel established between the first external electronic device and the second external electronic device, on the basis of information related to the communication channel.

Operation of Electronic Device that Transfers Communication Rights

Figure 11:
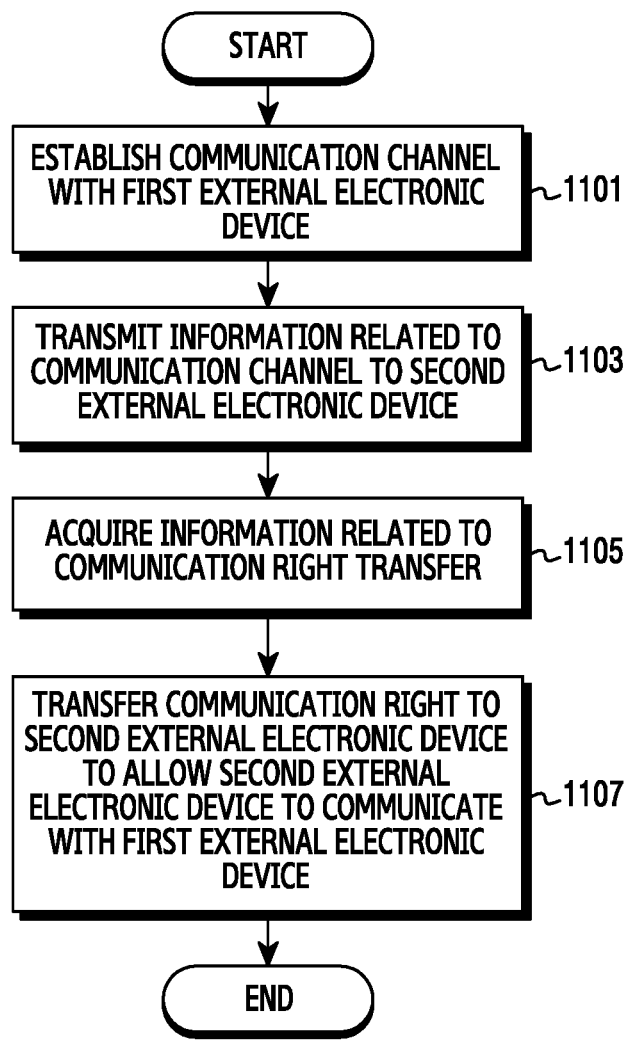
FIG. 11 is a flowchart illustrating an operation method of an external electronic device according to various embodiments.

FIG. 11 is a flowchart illustrating an operation method of an external electronic device according to various embodiments.

FIG. 11 may describe an example in which an external electronic device operating as a primary device from among external electronic devices operating as peripheral devices of the electronic device 101 transfers communication rights to an observer device. Hereinafter, for the convenience of explanation, description is provided using an example in which the primary device is a speaker device. According to various embodiments, even if the primary device is a microphone device, operation corresponding to FIG. 11 may be performed by the microphone device.

For purposes of FIG. 11, the method occurs at 520, 620, 720, 820, the first external electronic device corresponds to the electronic device 101, and the second electronic device corresponds to 510, 610, 710, and 810.

Referring to FIG. 11, in operation 1101, the processor 490 (e.g., one or more processors including a processing circuit) of the electronic device (e.g., the external electronic device 400) may establish (initiate) a communication channel with the first external electronic device (e.g., the electronic device 101 operating as an audio source device) through a short communication circuit (e.g., the communication circuit 410). According to an embodiment, the processor 490 may be connected (e.g., paired) with the first external electronic device via Bluetooth communication for music transmission and a call. According to an embodiment, when connected via Bluetooth communication, the electronic device 101 and the first external electronic device may communicate with each other by using a Bluetooth profile in which characteristics used for communication with a counterpart electronic device are specified. According to an embodiment, when the electronic device 101 and the first external electronic device transmit music, the processor 490 may process communication on the basis of an advanced audio distribution profile (A2DP). According to an embodiment, when the electronic device 101 and the first external electronic device perform a call function, the processor 490 may process communication on the basis of a hands-free profile (HFP). According to an embodiment, when the electronic device 101 and the first external electronic device perform simple voice transmission/reception (e.g., a voice recognition function or a call function), the processor 490 may process communication on the basis of a headset profile (HSP).

In operation 1103, the processor 490 may transmit information related to the communication channel to a second external electronic device (e.g., an observer device) through the short range communication circuit. According to an embodiment, in response to establishing the communication channel with the first external electronic device in the designated communication scheme, the processor 490 may generate information related to the communication channel established with the first external electronic device and may transmit the generated information related to the communication channel to at least one observer device in the periphery. According to an embodiment, the processor 490 may be in a state of acquiring (or receiving) an audio signal reproduced by the first external electronic device so as to reproduce (or output) the acquired audio signal, through the established communication channel.

In operation 1105, the processor 490 may acquire information related to a communication rights transfer. According to an embodiment, the processor 490 may acquire information related to a call received at the first external electronic device, through the short range communication circuit. According to an embodiment, the processor 490 may acquire information related to a battery level falling to a reference level or lower. According to an embodiment, the processor 490 may acquire information related to requesting the communication rights transfer from the observer device. According to an embodiment, the processor 490 may acquire information related to the communication rights transfer at least on the basis of a first trigger (e.g., an internal trigger) and a second trigger (e.g., an external trigger) related to the communication rights transfer.

In operation 1107, the processor 490 may hand over (transfer) the communication rights to the second external electronic device (e.g., an observer device, for example, a microphone device) at least on the basis of the interface related to the communication rights transfer, so as to enable the second external electronic device to communicate with the first external electronic device (e.g., the electronic device 101). According to an embodiment, on the basis of information related to a call, the processor 490 may transfer the communication rights to the second external electronic device so that the second external electronic device transmits, to the first external electronic device, an audio signal (e.g., a user voice signal) acquired in relation to the call by using the communication rights related to the communication channel.

Determining the Device to Take Primary Role (Receive Communication Rights)

FIG. 12 is a diagram for describing a method for establishing a communication channel between electronic devices in a system according to various embodiments of the present disclosure.

FIG. 12 may describe a state where there is no external electronic device for which a communication channel with the electronic device 101 is established. For example, in FIG. 12, descriptions will be provided for an example in which a communication channel with the electronic device 101 is established by a first external electronic device 1210 and the first external electronic device 1210 is configured as a primary device, in a state where the primary device and an observer device are not configured.

Referring to FIG. 12, in operation 1201, the first external electronic device 1210 may scan (or search) for a primary device in response to entering the system (e.g., turning on a device within a range in which communication with peripheral devices is possible, triggering for microphone use by a user, or the like). According to an embodiment, the first external electronic device 1210 may broadcast an advertisement packet in order to search for a primary device. For example, the first external electronic device 1210 may start a BLE advertisement. According to an embodiment, when starting operating, external electronic devices may start operating as observer devices in a state where no connection (e.g., communication channel establishment) is made with the electronic device 101.

After broadcasting the advertisement packet, if no response is received from a primary device for a predetermined time in operation 1203, the first external electronic device 1210 may be determined to function as a primary device, in operation 1205. For example, the first external electronic device 1210 may broadcast the advertisement packet, and when a predetermined time configured to receive a response corresponding to the advertisement packet expires (or timeout), the first external electronic device 1210 may determine that the first external electronic device 1210 itself functions as a primary device. According to an embodiment, in a case where no response is received from a primary device for a predetermined time, the case may represent, for example, a state where none of external electronic devices (e.g., a second external electronic device 1220 or a third external electronic device 1230) in the periphery of the first external electronic device 1210 are connected (e.g., pairing, designated communication channel establishment, etc.) to the electronic device 101.

In operation 1207, the first external electronic device 1210 may transmit a Bluetooth connection (BT connect) request to the electronic device 101 in response to determining the first external electronic device 1210 itself to function as a primary device.

In operation 1209, the electronic device 101 may transmit a Bluetooth connection response (BT connection grant) to the first external electronic device 1210 in response to the Bluetooth connection request of the first external electronic device 1210.

In operation 1211, the first external electronic device 1210 and the electronic device 101 may establish (initiate) a communication channel in a designated communication scheme (e.g., Bluetooth communication) on the basis of connecting operations (operation 1207 and operation 1209).

Then, the first external electronic device 1210 may transmit information related to the communication channel to at least one identified observer device (e.g., the second external electronic device 1220 and the third external electronic device 1230) through the communication channel of the designated communication scheme (e.g., BLE communication).

FIG. 13 is a diagram for describing a method for establishing a communication channel between electronic devices to perform communication therebetween in a system according to various embodiments of the present disclosure.

In FIG. 13, may describe a state where there is no external electronic device for which a communication channel with the electronic device 101 is established. For example, in FIG. 13, descriptions will be provided for an example in which a first external electronic device 1310 and a third external electronic device 1330 attempt to perform a role of a primary device at substantially the same time, in a state where the primary device and an observer device are not configured.

Referring to FIG. 13, in operation 1301 and operation 1303, the first external electronic device 1310 and the third external electronic device 1330 may scan (or search) for a primary device in response to entering the system (e.g., turning on a device within a range in which communication with peripheral devices is possible, triggering for function use by a user, or the like). According to an embodiment, the first external electronic device 1310 and the third external electronic device 1330 may broadcast an advertisement packet in order to search for a primary device. For example, the first external electronic device 1310 and the third external electronic device 1330 may start a BLE advertisement. According to an embodiment, the first external electronic device 1310 and the third external electronic device 1330 may start the BLE advertisement substantially at the same time. FIG. 13 provides description of an example in which the first external electronic device 1310 starts performing operation before the third external electronic device 1330.

After broadcasting the advertisement packet by each of the first external electronic device 1310 and the third external electronic device 1330, if no response is received from a primary device for a predetermined time in operation 1305 and operation 1307, the first external electronic device 1310 and the third external electronic device 1330 may be determined to function as a primary device, in operation 1309 and operation 1311. For example, the first external electronic device 1310 may broadcast the advertisement packet, and when a predetermined time configured to receive a response corresponding to the advertisement packet expires (or timeout), the first external electronic device 1310 may determine that the first external electronic device 1310 itself functions as a primary device. Likewise, the third external electronic device 1330 may broadcast the advertisement packet, and when a predetermined time configured to receive a response corresponding to the advertisement packet expires (or timeout), third external electronic device 1330 may determine that the third external electronic device 1330 itself functions as a primary device. According to an embodiment, two external electronic devices of the first external electronic device 1310 and the third external electronic device 1330 may attempt to perform a role of a primary device at substantially the same time due to response timeout.

In operation 1313 and operation 1315, each of the first external electronic device 1310 and the third external electronic device 1330 may transmit a Bluetooth connection (BT connect) request to the electronic device 101 in response to determining each of the first external electronic device 1310 and the third external electronic device 1330 to function as a primary device. According to an embodiment, FIG. 13 describes an example in which a Bluetooth connection request is first transmitted by the first external electronic device 1310.

In operation 1317, the electronic device 101 may transmit a Bluetooth connection response (e.g., a grant response) to the first external electronic device 1310 in response to the Bluetooth connection request of the first external electronic device 1310 that has first initiated the Bluetooth connection attempt.

In operation 1319, the electronic device 101 may transmit a Bluetooth connection response (e.g., a reject response) to the third external electronic device 1330 in response to the Bluetooth connection request of the third external electronic device 1330 that has attempted the Bluetooth connection after the first external electronic device 1310.

In various embodiments, two or more external electronic devices (e.g., the first external electronic device 1310 and the third external electronic device 1330) among the external electronic devices 1310, 1320, and 1330 may attempt to perform a primary role at substantially the same time due to response timeout, and may attempt to connect to the electronic device 101. In this case, the electronic device 101 may determine, as a connection target device, an external electronic device (e.g., the first external electronic device 1310) that has first made the connection attempt, and may transmit a connection grant signal to the corresponding external electronic device. The electronic device 101 may transmit a connection reject signal to the remaining external electronic device (e.g., the third external electronic device 1330). Therefore, the external electronic device (e.g., the first external electronic device 1310) that has first made the connection attempt establishes a connection with the electronic device 101 in response to connection grant from the electronic device 101, and the external electronic device (e.g., the third external electronic device 1330) that has made the connection attempt relatively later may be determined (or switched) to operate as an observer device in response to connection rejection from the electronic device 101. According to an embodiment, the first external electronic device 1310 may establish a first communication channel with the electronic device 101 in a designated communication scheme (e.g., Bluetooth communication), and may be determined (or switched) to operate as a primary device.

In operation 1321, the third external electronic device 1330 may scan (or search) for a primary device. According to an embodiment, the third external electronic device 1330 may be determined to function as an observer device in response to receiving the connection rejection from the electronic device 101. The third external electronic device 1330 may broadcast an advertisement packet to search for a primary device, in response to determining to function as an observer device. For example, the third external electronic device 1330 may start a BLE advertisement. According to an embodiment, the third external electronic device 1330 may correspond to a peripheral device of the first external electronic device 1310, and may periodically transmit a signal to enable a primary device to find the third external electronic device 1330.

In operation 1323, the first external electronic device 1310 may transmit a BLE connection request to the third external electronic device 1330. For example, the first external electronic device 1310 operating as a primary device may transmit a BLE connection request to the third external electronic device 1330 in response to receiving the BLE advertisement packet of the third external electronic device 1330. The first external electronic device 1310 and the external electronic device 1330 may establish a second communication channel in a designated communication scheme (e.g., BLE communication). According to an embodiment, in a case of a second external electronic device 1320 operating as an observer device, a BLE communication request may not be performed without regard to reception of the BLE advertisement packet. According to an embodiment, the third external electronic device 1330 may determine (or identify) a device that performs a primary role, on the basis of the connection request received in response to the BLE advertisement packet broadcast.

In operation 1325, when a second communication channel with the third external electronic device 1330 is established in a designated communication scheme (e.g., BLE communication), the first external electronic device 1310 that is the primary device may transmit information related to the communication channel to the third external electronic device 1330 through the second communication channel. According to an embodiment, the first external electronic device 1310 may transmit, to the third external electronic device 1330, information related to the first communication channel established in a designated communication scheme (e.g., Bluetooth communication) between the electronic device 101 and the first external electronic device 1310.

In operation 1327, the third external electronic device 1330 may perform an observer role. For example, the third external electronic device 1330 may operate as an observer device and may start acquiring an audio signal in a sniffing scheme by using information related to the communication channel.

In operation 1329, the electronic device 101 may reproduce (or output) an audio signal (continuously when the electronic device 101 has been reproducing the audio signal). As illustrated in FIG. 13, the audio signal reproduced by the electronic device 101 may be transmitted to the first external electronic device 1310 with which a communication channel has been established in the designated communication scheme (e.g., Bluetooth communication), and may be sniffed by the third external electronic device 1330 that is the observer device. For example, the third external electronic device 1330 may access the communication channel between the electronic device 101 and the first external electronic device 1310 so as to acquire, in a sniffing scheme, the audio signal transmitted from the electronic device 101 to the external electronic device 1310 through the communication channel. According to an embodiment, the third external electronic device 1330 may further provide a response signal (e.g., an ACK signal or an NACK signal) related to the acquired audio signal to the first external electronic device 1310 that is the primary device in the designated communication scheme (e.g., BLE communication).

In operation 1331, the first external electronic device 1310 that is the primary device may transmit the response signal (e.g., an ACK signal or an NACK signal) related to the received audio signal to the electronic device 101 in the designated communication scheme (e.g., Bluetooth communication). According to various embodiments, the first external electronic device 1310 may combine information on whether the third external electronic device 1330 that is an observer device has received an audio packet with information on whether the first external electronic device 1310 itself has received an audio packet, so as to transmit a response signal (e.g., an ACK signal or an NACK signal) to the electronic device 101. When at least one external electronic device has failed to receive the audio packet, the corresponding audio packet may be retransmitted.

Connection of Electronic Device to Primary Device and Changing Primary Device

FIG. 14 is a flowchart illustrating an operation method of the electronic device according to various embodiments of the present disclosure.

FIG. 14 may illustrate an example in which the electronic device 101 operating as an audio source device transfers communication rights between external electronic devices to direct a change of a primary device and acquires an audio signal from a changed primary device so as to process the acquired audio signal. In FIG. 14, for the convenience of explanation, description is provided using an example in which a primary device is a speaker device and a target observer device, the role of which is to be changed to a primary role, is a microphone device.

Referring to FIG. 14, in operation 1401, the processor 120 (e.g., one or more processors including a processing circuit) of the electronic device 101 may be connected with a primary device (e.g., a speaker device). According to an embodiment, the processor 120 may establish (or initiate) a communication channel with a primary device in a designated communication scheme (e.g., Bluetooth communication) through a short range communication circuit (e.g., the wireless communication module 912). For example, the processor 120 may be connected (e.g., paired) with a primary device through Bluetooth communication for music transmission. In this case, the electronic device 101 and the primary device may communicate with each other on the basis of an A2DP related to music reproduction from among Bluetooth profiles.

In operation 1403, the processor 120 may reproduce audio data. According to an embodiment, the processor 120 may reproduce audio data selected by a user and may transmit an audio signal (or an audio packet) related to the reproduced audio data to the primary device through the established communication channel. According to various embodiments, the primary device may receive the audio signal transmitted from the electronic device 101 through the communication channel and reproduce the received audio signal. According to various embodiments, in a case of observer devices, the audio signal between the electronic device 101 and the primary device may be acquired using information related to the communication channel and then reproduced.

In operation 1405, the processor 120 may determine whether a mode change is detected during reproduction of the audio data. According to an embodiment, the processor 120 may determine whether a trigger related to a communication rights transfer occurs, which requires a change of the primary device. According to an embodiment, the processor 120 may detect a first trigger (e.g., an internal trigger) or a second trigger (e.g., an external trigger) related to a communication rights transfer. According to an embodiment, when a primary device is a speaker device, the processor 120 may determine to change a microphone device as the primary device in a case where it is necessary to acquire an audio signal (e.g., a voice signal) from the outside of the electronic device 101 (e.g., a user) (e.g., performing/detecting a call function or a voice recognition function, etc.). According to an embodiment, the processor 120 may determine to change the primary device at least on the basis of a state change of the primary device (e.g., detecting a battery level equal to or lower than a reference level, detecting a change to a sleep state in a primary device, etc.).

In operation 1405, if a mode change is not detected (NO in operation 1405), the processor 120 may proceed to operation 1403 to process operations subsequent to operation 1403.

If a mode change is detected (YES in operation 1405) in operation 1405, the processor 120 may request a change of a primary device from the primary device in operation 1407. According to an embodiment, the processor 120 may generate information related to transferring communication rights of the primary device so as to enable the electronic device 101 to communicate (e.g., bidirectional communication) with an observer device capable of performing a function corresponding to the trigger from among observer devices. The processor 120 may transmit information related to the communication rights transfer to the primary device through the communication channel of the designated communication scheme (e.g., Bluetooth communication) by using the short range communication circuit. According to an embodiment, the processor 120 may transmit, to the primary device, an instruction that enables a microphone device to acquire the communication rights of the primary device so that the microphone device among observer devices can transmit, to the electronic device 101, an audio signal acquired from a user by using the communication channel of the designated communication scheme (e.g., Bluetooth communication). For example, the processor 120 may direct the microphone device to change from an observer device to a primary device by receiving rights transferred from the primary device by the microphone device.

In operation 1409, the processor 120 may receive an audio signal from the primary device. According to an embodiment, the processor 120 may receive an audio signal (e.g., a voice signal) from the changed primary device (e.g., a microphone device). For example, the previous primary device may transfer the rights thereof to one observer device (e.g., a microphone device) corresponding to a request of the electronic device 101 from among observer devices and may change its role to a role an observer device. The previous primary device, the role of which is changed, may acquire the audio signal reproduced by the electronic device 101, in a sniffing scheme to reproduce the same. The observer device (e.g., a microphone device) of observer devices, which has received the rights from the primary device, may be changed to function as a primary device. The observer device having a changed role thereof may operate as the primary device so as to acquire an audio signal (e.g., a voice signal) from the outside (e.g., a user) and transmit the audio signal to the electronic device 101 by using the communication channel. According to an embodiment, the electronic device 101 and the changed primary device may communicate with each other on the basis of an HFP related to a call from among Bluetooth profiles.

In operation 411, the processor 120 may process the received audio signal. According to an embodiment, when a mode change has occurred upon performing a call function, the processor 120 may transmit the received audio signal to a counter electronic device connected for a call. According to an embodiment, when a mode change has occurred upon performing a voice recognition function, the processor 120 may process an operation related to voice recognition at least on the basis of the received audio signal.

Connection of the Primary Device to Electronic Device, and Transferring Rights

FIG. 15 is a flowchart illustrating an operation method of the electronic device according to various embodiments of the present disclosure.

FIG. 15 may illustrate an example in which a primary device transfers communication rights to one observer device among observer devices operating as peripheral devices of the primary device so as to enable the corresponding observer device to change its role to a role the primary device. In FIG. 15, for the convenience of explanation, description is provided using an example in which the primary device is a speaker device. According to various embodiments, even if the primary device is a microphone device, operation corresponding to FIG. 15 may be performed by the microphone device.

In operation 1501, the processor 490 (e.g., one or more processors including a processing circuit) of the primary device (e.g., a speaker device) may be connected with the electronic device 101. According to an embodiment, the processor 490 may establish (or initiate) a communication channel with the electronic device 101 in a designated communication scheme (e.g., Bluetooth communication) through a short range communication circuit (e.g., the communication circuit 410). For example, the processor 490 may be connected (e.g., paired) with the electronic device 101 through Bluetooth communication for music reception. According to an embodiment, the electronic device 101 and the primary device may communicate with each other on the basis of an A2DP related to music reproduction from among Bluetooth profiles.

In operation 1503, the processor 490 may transmit information related to the communication channel established between the electronic device 101 and the primary device to one or more observer devices connected in a designated communication scheme (e.g., BLE communication). In various embodiments, the information related to the communication channel may be used for an observer device to access (or search) the communication channel between the electronic device 101 and the primary device. According to an embodiment, the information related to the communication channel may be used for the observer device to access the communication channel to acquire, in a designated scheme (e.g., a sniffing scheme), data (or packet) transmitted or received through the communication channel. According to an embodiment, when the primary device and the electronic device 101 establish a communication channel on the basis of Bluetooth protocols, information relating to the communication channel may include at least one communication related parameter, such as BD_ADDR (Bluetooth device address), LT_ADDR (logical transport address), a native clock of SRC (source) (e.g., an audio source device, for example, a native clock of the electronic device 101), a clock offset between SRC and SNK (sink) (e.g., a primary device), an encryption parameter (e.g., key change) for a link between SRC and SNK, and the like.

In operation 1505, the processor 490 may process a corresponding operation. For example, the processor 490 may reproduce or transmit an audio signal. According to an embodiment, when the primary device is a speaker device, the processor 490 may output, through a speaker, audio data acquired from the electronic device 101 through the communication channel established between the primary device and the electronic device 101. According to an embodiment, when the primary device is a microphone device, the processor 490 may transmit audio data acquired from a user to the electronic device 101 through the communication channel established between the primary device and the electronic device 101.

In operation 1507, the processor 490 may determine whether a mode change has occurred during performance of a corresponding operation. According to an embodiment, the processor 490 may determine whether a trigger related to a communication rights transfer occurs, which requires a change of the primary device. According to an embodiment, the processor 490 may detect a first trigger (e.g., an internal trigger) or a second trigger (e.g., an external trigger) related to a communication rights transfer. According to an embodiment, the processor 490 may determine a mode change on the basis of detecting a battery level of the primary device falling to a preset reference level or lower. According to an embodiment, the processor 490 may determine a mode change on the basis of detecting a switch to a sleep state in the primary device. According to an embodiment, the processor 490 may determine a mode change on the basis of receiving, from another electronic device (e.g., the electronic device 101 and an observer device), a request related to a rights transfer.

In operation 1507, if a mode change is not detected (NO in operation 1507), the processor 490 may proceed to operation 1505 to process operations subsequent to operation 1505.

If a mode change is detected (YES in operation 1507) in operation 1507, the processor 490 may determine, in operation 1509, a target device to perform a primary role from among observer devices. According to an embodiment, the processor 490 may determine a target device at least on the basis of a type or the detected mode change (or a trigger type). According to an embodiment, when a mode change is caused by an internal trigger, such as switching to a sleep state or decrease of a battery level to a reference level or lower, the processor 490 may determine an observer device satisfying a configuration condition (or with reference to a configured priority) from among observer devices, as a target device to perform a primary role. For example, the processor 490 may determine, as the target device, an observer device having a highest battery level from among observer devices. According to an embodiment, when a mode change is caused by an external trigger, such as a rights transfer request of the electronic device 101, the processor 490 may interwork with the electronic device 101 to determine, as the target device, an observer device (e.g., a microphone device) capable of performing an associated function (e.g., a call function). According to an embodiment, when the target device for the rights transfer is designated by the electronic device 101 or a mode change is caused by reception of a rights transfer request from an observer device, the processor 490 may determine the corresponding observer device as the target device.

In operation 511, the processor 490 may transfer rights to the determined target device (e.g., an observer device). According to an embodiment, the processor 490 may hand over (transfer) communication rights to an observer device that is the determined target device so as to enable the observer device to communicate with the electronic device 101.

In operation 1513, the processor 490 may change a mode of the primary device. According to an embodiment, on the basis of transferring the rights that enables the observer device to operate as the primary device, the processor 490 may change a role of its own electronic device (e.g., a current primary device) to a role of an observer device. According to an embodiment, at the time of changing roles from a primary device to an observer device, the processor 490 may further perform processing, such as turning off power or switching to a sleep state, at least partially based on a use state of the electronic device.

Connection of Observer Device and Receiving Communication Rights

FIG. 16 is a flowchart illustrating an operation method of the electronic device according to various embodiments of the present disclosure.

FIG. 16 may illustrate an example in which an observer device receives a right transferred from a primary device and changes a role of the observer device to a role of the primary device so as to operate as the primary device. For example, FIG. 16 may illustrate an example in which the observer device establishes (initiates) a communication channel with the primary device in a designated communication scheme (e.g., BLE communication) and changes, while operating as the observer device, the role of the observer device to the role of the primary device on the basis of a mode change. In FIG. 16, for the convenience of explanation, description is provided using an example in which the observer device is a microphone device. According to various embodiments, even if the observer device is a speaker device, operation corresponding to FIG. 16 may be performed by the speaker device.

In operation 1601, the processor 390 (e.g., one or more processors including a processing circuit) of the observer device (a microphone device) may scan (or search) for the primary device. According to an embodiment, the processor 390 may search for the primary device in response to turning on of an electronic device (e.g., an observer device) or a trigger for microphone use by a user. According to an embodiment, the processor 390 may broadcast an advertisement packet in order to search for the primary device. For example, the processor 390 may start a BLE advertisement through a short range communication circuit (e.g., a communication circuit 310).

In operation 1603, the processor 390 may determine whether a connection request is received from an external electronic device (e.g., a primary device). According to an embodiment, after broadcasting of the advertisement packet, the processor 390 may determine whether a response (e.g., a BLE connection request) is received from the primary device for a predetermined time.

In 1603, when no response is received from the external electronic device (NO in operation 1603), the processor 390 may determine in operation 1605 whether a predetermined time configured for response reception has elapsed.

In operation 1605, when a response standby has not timed out (NO in operation 1605), the processor 390 may proceed to operation 1601 to process operations subsequent to operation 1601.

In operation 1605, when it is determined that the response standby has timed out (YES in operation 1605), the processor 390 may determine the electronic device to be the primary device in operation 1607. According to an embodiment, the processor 390 may determine the electronic device to perform the role of the primary device, when the advertisement packet is broadcasted and the predetermined time configured for response reception corresponding to the advertisement packet expires.

In operation 1609, the processor 390 may be connected with the electronic device 101 in response to determination as the role of the primary device. According to an embodiment, the processor 390 may establish (or initiate) a communication channel with the electronic device 101 in a designated communication scheme (e.g., Bluetooth communication) through the short range communication circuit (e.g., the communication circuit 310).

In operation 1611, the processor 390 may transmit information related to the communication channel to the observer device through the short range communication circuit. According to an embodiment, the processor 390 may generate information related to the communication channel established with the electronic device 101, in response to establishing the communication channel with the electronic device 101 in the designated communication scheme, and may transmit the generated information related to the communication channel to at least one observer device in the periphery.

In operation 1613, the processor 390 may process an operation corresponding to the primary device. According to an embodiment, the processor 390 may transmit, to the electronic device 101, a response signal (e.g., an ACK signal or an NACK signal) corresponding to an audio signal acquired from the electronic device 101 and at least one audio signal (e.g., a voice signal) acquired from the outside (e.g., a user), through the established channel with the electronic device 101.

In operation 1603, when a response is received from an external electronic device (YES in operation 1603), the processor 930 may identify which device is a primary device in operation 1605 on the basis of the response received according to the advertisement packet broadcast.

In operation 1617, the processor 390 may receive information related to the communication channel from the primary device. According to an embodiment, when a communication channel with the primary device is established in a designated communication scheme (e.g., BLE communication), the processor 390 may receive information related to the communication channel established between the primary device and the electronic device 101, through the short range communication circuit.

In operation 1619, the processor 390 may process an operation corresponding to the observer device. According to an embodiment, the processor 390 may access the communication channel between the primary device and the electronic device 101 by using information related to the communication channel, so as to acquire an audio signal transmitted or received through the communication channel, in a designated scheme (e.g., a sniffing scheme). According to an embodiment, the processor 390 may transmit, to the primary device, a response signal (e.g., an ACK signal or an NACK signal) corresponding to the acquired audio signal.

In operation 1621, the processor 390 may determine whether a mode change is detected. According to an embodiment, the processor 390 may determine whether there occurs a trigger related to a communication rights transfer which requires a change to the primary device. According to an embodiment, the processor 390 may detect a first trigger (e.g., an internal trigger) or a second trigger (e.g., an external trigger) related to the communication rights transfer. According to an embodiment, the processor 390 may determine a mode change on the basis of detecting a request (e.g., a command for microphone use) for a change to the primary device from a user. According to an embodiment, the processor 390 may determine a mode change on the basis of receiving a request related to a rights transfer from the primary device.

If a mode change is not detected (NO in operation 1621) in operation 1621, the processor 390 may proceed to operation 1619 to process operations subsequent to operation 1619.

If a mode change is detected (YES in operation 1621) in operation 1621, the processor 390 may request, in operation 1623, a rights transfer from the primary device. According to an embodiment, in a case of a mode change by reception of a request related to the rights transfer from the primary device, operation 1621 may not be performed.

In operation 1625, the processor 390 may change a mode of the observer device. According to an embodiment, the processor 390 may change the role of the observer device to the role of the primary device on the basis of acquiring the rights transferred from the primary device. According to an embodiment, in response to changing roles from the observer device to the primary device, the processor 390 may process an operation corresponding to the primary device.

According to various embodiments, although not illustrated in FIG. 16, when the observer device is changed to the primary device and then operation as the primary device is completed, the processor 390 may automatically transfer the rights to the previous primary device. According to an embodiment, when completion of an operation (e.g., a call function or a voice recognition function) requiring a microphone is detected (e.g., detection by a user request, detection by function termination, detection by a request of the electronic device 101, etc.), the processor 390 may transfer the rights to the previous primary device and may switch back its own role to an observer role. According to an embodiment, when changing a mode, the processor 390 may store identification information related to the previous primary device and may transfer the rights on the basis of the stored identification information.

Figure 17:
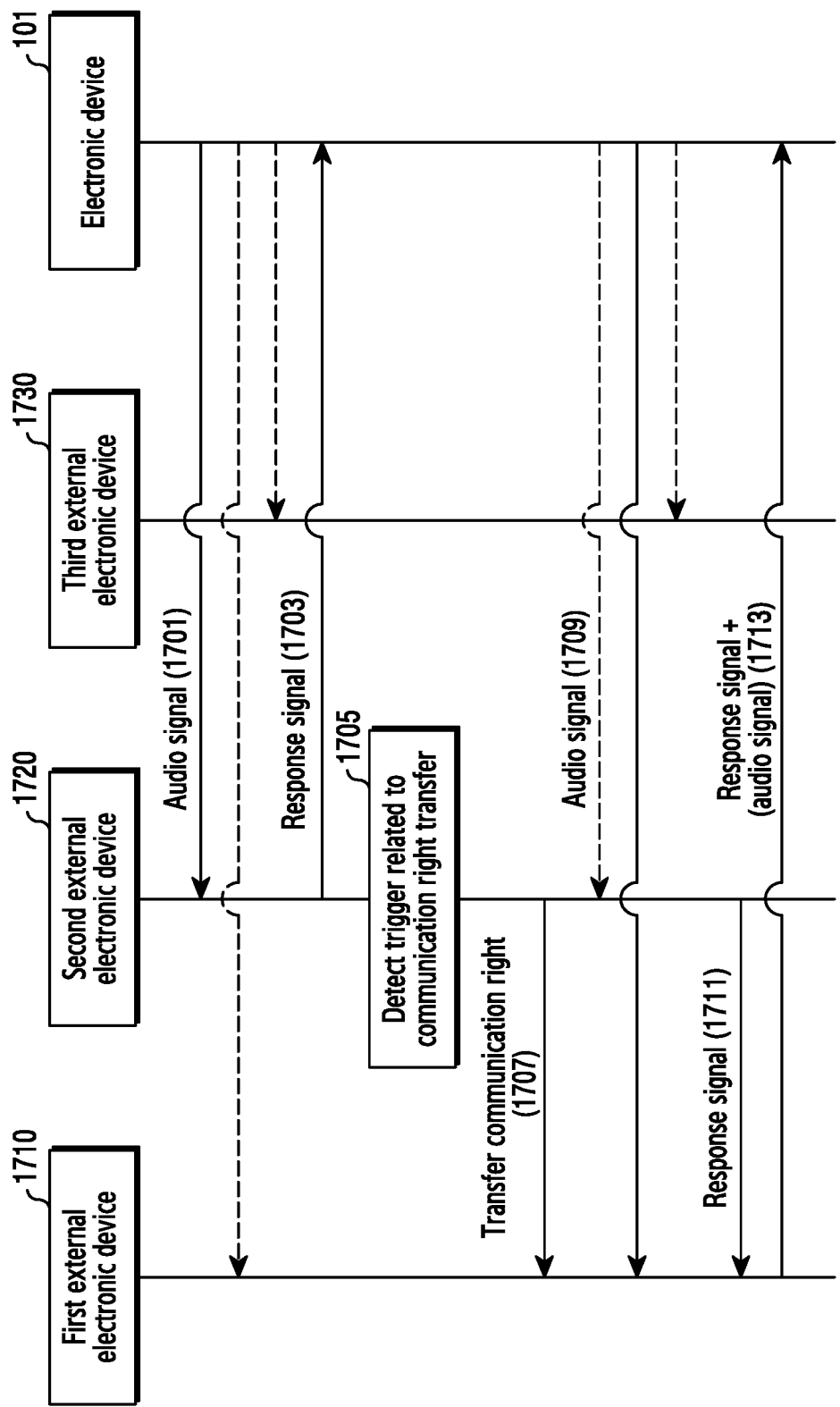
FIG. 17 is a diagram for describing an operation based on a communication rights transfer between devices in a system according to various embodiments.

FIG. 17 is a diagram for describing an operation based on a communication rights transfer between devices in a system according to various embodiments of the present disclosure.

In FIG. 17, the electronic device 101 and a second external electronic device 1720 may be in a state where a first communication channel has been established therebetween in a designated communication scheme (e.g., Bluetooth communication). For example, in FIG. 17, the second external electronic device 1720 may operate as a primary device, wherein a first external electronic device 1710 and a third external electronic device 1730 are in a state where a second communication channel with the second external electronic device 1720 has been established in a designated communication scheme (e.g., BLE communication), and may operate as observer devices. FIG. 17 may illustrate an example of changing a subject that transmits a response signal (e.g., an ACK signal or an NACK signal) corresponding to an audio signal transmitted by the electronic device 101, depending on a primary device type (e.g., a microphone device or a speaker device).

Referring to FIG. 17, in operation 1701, the electronic device 101 may transmit an audio signal to the second external electronic device 1720 that is a primary device through the first communication channel of the designated communication scheme (e.g., Bluetooth communication). In operation 1701, the first external electronic device 1710 and the third external electronic device 1730 which are observer devices may acquire, in a sniffing scheme, the audio signal transmitted from the electronic device 101 to the second external electronic device 1720 through the first communication channel.

In operation 1703, the second external electronic device 1720 may transmit, to the electronic device 101, a response signal (e.g., an ACK signal or an NACK signal) corresponding to the audio signal received from the electronic device 101. According to an embodiment, when a packet related to the audio signal is not received, the second external electronic device 1720 performing a primary role may transmit a response signal to the electronic device 101 to enable the corresponding packet to be retransmitted from the electronic device 101.

In operation 1705, the second external electronic device 1720 may detect a trigger related to a communication rights transfer. According to an embodiment, the trigger related to the communication rights transfer may be generated at least on the basis of a first trigger or a second trigger by one electronic device from among the electronic device 101, the primary device (e.g., the second external electronic device 1720), and the observer devices (e.g., the first external electronic device 1710 and the third external electronic device 1730). According to an embodiment, in FIG. 17, it is assumed that a target device for the communication rights transfer is the first external electronic device 1710 that is a microphone device.

In operation 1707, the second external electronic device 1720 may transfer a communication rights to the first external electronic device 1710 that is the target device in response to the trigger related to the communication rights transfer. According to an embodiment, the second external electronic device 1720 may transfer an associated instruction to allow the first external electronic device 1710 to operate as the primary device. According to various embodiments, when a procedure of the communication rights transfer is completed, the second external electronic device 1720 that is the previous primary device may perform an observer role, and the first external electronic device 1710 that is the previous observer device may perform a primary role.

According to various embodiments, on the basis of changes in roles between the first external electronic device 1710 and the second external electronic device 1720, as illustrated in operation 1709, the audio signal transmitted by the electronic device 101 may be transmitted to the first external electronic device 1710, the role of which is changed to the primary role, through the first communication channel. As illustrated in operation 1709, the second external electronic device 1720, the role of which is changed to the observer role, and the third external electronic device 1730 that is an existing observer device may acquire, in a sniffing scheme, the audio signal transmitted from the electronic device 101 to the first external electronic device 1710 through the first communication channel.

According to an embodiment, the first external electronic device 1710 may be a microphone device. Therefore, the first external electronic device 1710 may not acquire the audio signal transmitted from the electronic device 101 to the first external electronic device 1710 through the first communication channel or may not process the acquired audio signal. Accordingly, in various embodiments, the microphone device performing the primary role may receive a response signal (e.g., an ACK signal or an NACK signal) corresponding to the audio signal, transferred from a speaker device (e.g., an observer role) so as to prevent a packet loss associated with the audio signal.

For example, as illustrated in operation 1711, the second external electronic device 1720 may transmit the response signal (e.g., an ACK signal or an NACK signal) related to the acquired audio signal to the first external electronic device 1710. According to an embodiment, since the second external electronic device 1720 performing the observer role is unable to transmit the response signal directly to the electronic device 101, the second external electronic device 1720 may transfer the response signal and/or an associated instruction to the first external electronic device 1710 performing the primary role, so as to enable the first external electronic device 1710 performing the primary role to transmit the response signal to the electronic device 101 instead of the second external electronic device 1720. According to an embodiment, the second external electronic device 1720 may transmit the response signal to the first external electronic device 1710 through the second communication channel established between the first external electronic device 1710 and the second external electronic device 1720 in the designated communication scheme (e.g., BLE communication).

In operation 1713, the first external electronic device 1710 may transmit, to the electronic device 101, a response signal (e.g., an ACK signal or an NACK signal) corresponding to the audio signal transmitted by the electronic device 101. According to an embodiment, when a packet related to the audio signal is not received, the first external electronic device 1710 performing the primary role may transmit the response signal transferred from the second external electronic device to the electronic device 101 to enable the corresponding packet to be retransmitted from the electronic device 101.

According to an embodiment, in operation 1713, the first external electronic device 1710 may add, to transmission of the response signal, transmitting an audio signal (e.g., a voice signal of a user) acquired through a microphone to the electronic device 101 sequentially, in parallel, or independently. For example, the first external electronic device 1710 may transmit, to the electronic device 101, data (e.g., a response signal) received from the second external electronic device 1720 and audio data (e.g., a user voice signal) acquired from the outside, through the short range communication circuit (e.g., the communication circuit 310).

Figure 18:
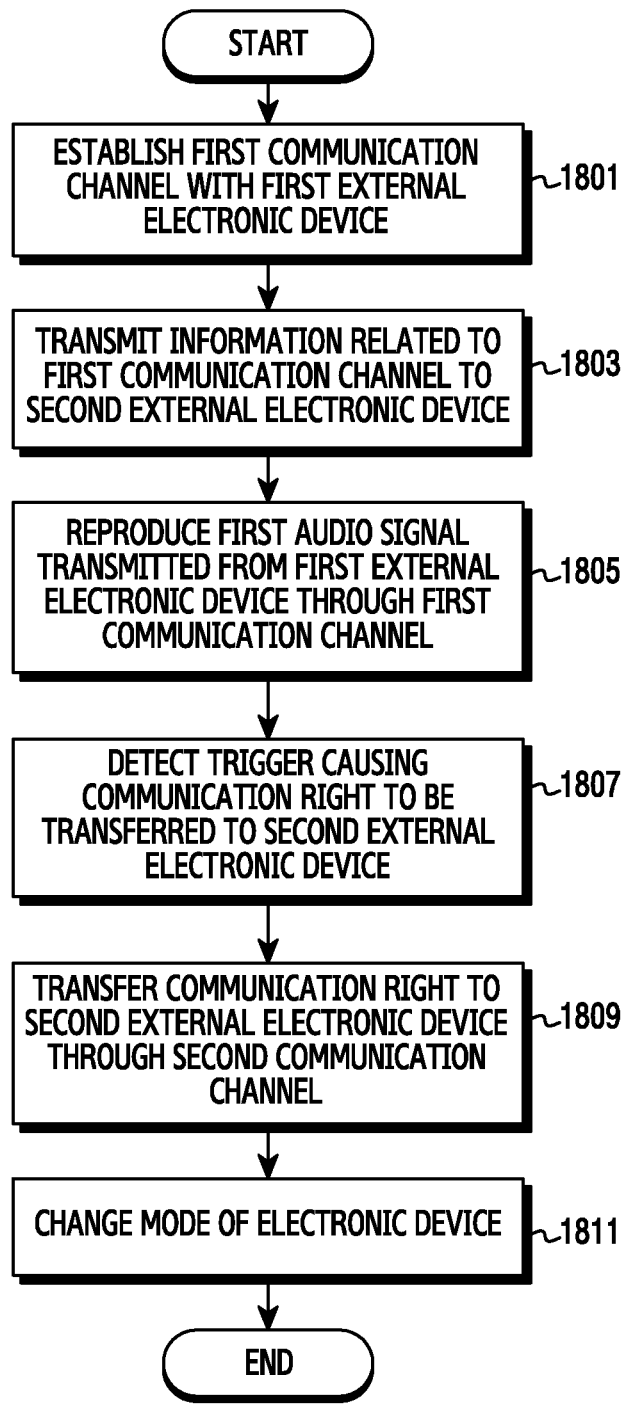
FIG. 18 is a flowchart illustrating an operation method of the electronic device according to various embodiments of the present disclosure.

FIG. 18 is a flowchart illustrating an operation method of the electronic device according to various embodiments of the present disclosure.

FIG. 18 illustrates an example in which an external electronic device operating as a primary device from among external electronic devices operating as peripheral devices of the electronic device 101 transfers communication rights to an observer device. Hereinafter, for the convenience of explanation, description is provided using an example in which the primary device is a speaker device.

Referring to FIG. 18, in operation 1801, the processor 490 (e.g., one or more processors including a processing circuit) of the electronic device (e.g., the external electronic device 400) may establish a first communication channel with a first external electronic device (e.g., the electronic device 101 operating as an audio source device). According to an embodiment, the processor 490 may establish (or initiate) the first communication channel with the first external electronic device by using a designated communication scheme through a short range communication circuit (e.g., the communication circuit 410). According to an embodiment, the processor 490 may be connected (e.g., paired) with the first external electronic device through Bluetooth communication related to music transmission and a call.

In operation 1803, the processor 490 may transmit information related to the first communication channel to a second external electronic device (e.g., an observer device). According to an embodiment, the processor 490 may transmit the information related to the first communication channel to the second external electronic device through a second communication channel established using a designated communication scheme (e.g., BLE communication) with the second external electronic device.

In operation 1805, the processor 490 may reproduce a first audio signal transmitted from the first external electronic device through the first communication channel. According to an embodiment, the processor 490 may acquire (or receive) the audio signal reproduced by the first external electronic device through the communication channel established with the first external electronic device, so as to reproduce (or output) the acquired audio signal through a speaker. According to an embodiment, the processor 490 may transmit a response signal related to a reception state (e.g., whether the audio signal is received or not received) of the audio signal received from the first external electronic device, to the first external electronic device through the first channel.

In operation 1807, the processor 490 may sense (or detect) a trigger allowing communication rights to be transferred to the second external electronic device. According to an embodiment, the processor 490 may detect, from the first external electronic device or the second external electronic device, a trigger allowing communication rights of the electronic device 400 to be transferred to the second external electronic device that is an observer device. According to an embodiment, the processor 490 may recognize occurrence of a trigger for a communication rights transfer, on the basis of information related to a call received at the first external electronic device. According to an embodiment, the processor 490 may recognize occurrence of the trigger for the communication rights transfer, on the basis of information related to requesting the communication rights by the second external electronic device. For example, detecting of the trigger may include identifying a request for acquiring an external audio signal, on the basis of the second external electronic device, and acquiring information related to a call of the first external electronic device or information relating to voice recognition of the second external electronic device.

In operation 1809, the processor 490 may transfer the communication rights to the second external electronic device through the second communication channel. According to an embodiment, the processor 490 may transfer the communication rights of the electronic device 400 to the second external electronic device through the second communication. For example, the processor 490 may transfer the communication rights to the second external electronic device (e.g., an observer device, for example, a microphone device) to enable the second external electronic device to communicate (e.g., operate as a primary device) with the first external electronic device (e.g., the electronic device 101) on the basis of the first communication channel.

In operation 1811, the processor 490 may change a mode of the electronic device 400. According to an embodiment, the processor 490 may configure a mode (or a role) of the electronic device 400 so that the electronic device 400 having operated as the primary device to operate as an observer device, in response to transferring the communication rights to the second external electronic device.

Figure 19:
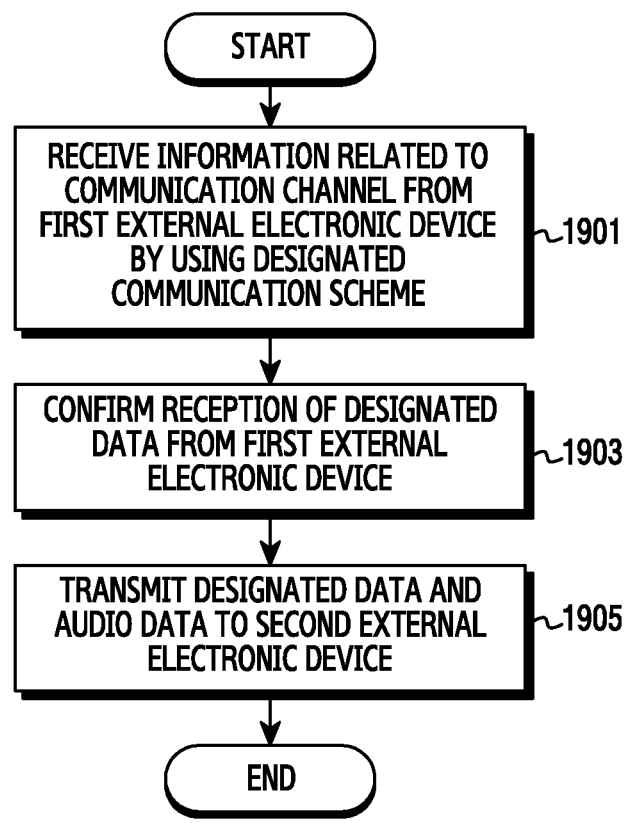
FIG. 19 is a flowchart illustrating an operation method of the electronic device according to various embodiments of the present disclosure.

FIG. 19 is a flowchart illustrating an operation method of the electronic device according to various embodiments of the present disclosure.

FIG. 19 may describe an example in which an external electronic device operating as an observer device from among external electronic devices operating as peripheral devices of the electronic device 101 changes a mode (or a role) to a primary device mode and operates according thereto. Hereinafter, for the convenience of explanation, description is provided using an example in which the observer device is a microphone.

Referring to FIG. 19, in operation 1901, the processor 390 (e.g., one or more processors including a processing circuit) of the electronic device (e.g., the electronic device 300) may receive information related to a communication channel from a first external electronic device (e.g., a primary device) by using a designated communication scheme. According to an embodiment, the processor 390 may receive, from the first external electronic device, information related to a communication channel established between the first external electronic device (e.g., a primary device) and a second external electronic device (e.g., an audio source device, for example, the electronic device 101) by using a designated communication scheme (e.g., BLE communication) through a short range communication circuit (e.g., the communication circuit 310).

In operation 1903, the processor 390 may confirm reception of designated data from the first external electronic device. According to an embodiment, the processor 390 may configure the electronic device 300 to operate as the primary device, at least on the basis of reception of the designated data from the first external electronic device. For example, the processor 390 may receive communication rights enabling communication with the second external electronic device, at least on the basis of reception of the designated data from the first external electronic device. The processor 390 may perform configuration to communicate with the second external electronic device by using the designated communication scheme, in response to receiving the communication rights on the basis of the designated data.

According to an embodiment, when the designated data (e.g., information related to ACK and NACK) is received from the first external electronic device, which has previously operated as the primary device, the processor 390 may configure the electronic device 300 (e.g., currently operating as an observer device) to operate as the primary device. According to an embodiment, the first external electronic device may transmit, to the second external electronic device (e.g., an audio source device, for example, the electronic device 101), designated data (e.g., information related to a reception state of the audio signal received from the second external electronic device by the first external electronic device) related to transmission/reception of an audio signal (e.g., a music related signal) received from the second external electronic device, via the electronic device 300. The electronic device 300 may operate as the primary device so as to enable an audio signal that is input (or recorded) through a microphone to be transmitted to the second external electronic device, in response to receiving the designated data from the first external electronic device.

In operation 1905, the processor 390 may transmit the designated data and audio data to the second external electronic device. According to an embodiment, when reception of the designated data from the external electronic device is confirmed, the processor 390 may transmit the received designated data and the audio data acquired through the microphone to the second external electronic device through the short range communication circuit. According to an embodiment, the processor 390 may perform configuration to determine a response signal (e.g., an ACK signal or an NACK signal) and transmit the determined response signal to the second external electronic device, at least on the basis of information related to the reception state of the audio signal received from the first external electronic device, and the reception state of the audio signal received from the second external electronic device by the electronic device 300. According to an embodiment, when transmitting the response signal, the processor 390 may perform configuration so that the audio data (e.g., a user voice signal) acquired from the microphone is transmitted along with the response signal.

As described above, an operation method of an electronic device according to various embodiments may include: establishing a first communication channel with a first external electronic device by using a designated communication scheme; transmitting information related to the first communication channel to a second external electronic device through a second communication channel established using a designated communication scheme with the second external electronic device; reproducing a first audio signal transmitted from the first external electronic device through the first communication channel; from the first external electronic device or the second external electronic device, detecting a trigger that causes communication rights of the electronic device to be transferred to the second external electronic device; transferring the communication rights of the electronic device to the second external electronic device through the second communication channel on the basis of detecting of the trigger; and changing a mode of the electronic device in response to transferring of the communication rights.

According to various embodiments, detecting of the trigger may include confirming a request for an external audio signal, on the basis of the second external electronic device.

According to various embodiments, detecting of the trigger may further include acquiring information related to a call of the first external electronic device or information related to voice recognition of the second external electronic device.

According to various embodiments, reproducing of the audio signal may include transmitting a response signal related to whether the audio signal received from the first external electronic device is not received, to the first external electronic device through the first communication channel.

According to various embodiments, the second external electronic device may acquire information related to the communication channel from the electronic device through the second communication channel, and may acquire an audio signal transmitted from the first external electronic device to the electronic device, on the basis of information related to the communication channel.

According to various embodiments, the second external electronic device may: receive the communication rights transferred from the electronic device; acquire an audio signal to be transmitted to the first external electronic device, by using a microphone functionally connected with the electronic device; and transmit the audio signal to the first external electronic device through the first communication channel by using information related to the communication channel.

According to various embodiments, the second external electronic device may acquire rights transfer information related to the call of the first external electronic device or may acquire the rights transfer information in response to a trigger related to using the microphone.

According to various embodiments, the second external electronic device may transmit data received at the electronic device and an audio signal acquired through the microphone to the first external electronic device by using information related to the communication channel.

While the disclosure has been shown and described with reference to certain embodiments thereof, it will be understood by those skilled in the art that the scope of the present disclosure is not defined by the detailed description and the embodiments described herein, but that various changes in form and details may be made without departing from the spirit and scope of the disclosure as defined by the appended claims and their equivalents.

What is claimed is:

1. An electronic device comprising:
a short range communication circuit; and
a processor, wherein the processor is configured to:
 establish a communication channel with a first external electronic device by using a designated communication scheme, through the short range communication circuit;
 transmit information related to the communication channel to a second external electronic device through the short range communication circuit;
 receive from the first external electronic device, a request to transfer communication rights from the electronic device to the second external electronic device; and
 transfer the communication rights from the electronic device to the second external electronic device.

2. The electronic device of claim 1, wherein the processor is configured to transmit a response signal related to whether an audio signal received from the first external electronic device is not received, to the first external electronic device through the first communication channel.

3. The electronic device of claim 1, wherein the processor is configured to:
establish a first communication channel with the first external electronic device in the designated communication scheme, through the short range communication circuit; and
establish a second communication channel with the second external electronic device in the designated communication scheme, through the short range communication circuit.

4. An electronic device comprising:
a short range communication circuit; and
a processor, wherein the processor is configured to:
 establish a communication channel with a first external electronic device by using a designated communication scheme, through the short range communication circuit,
 transmit information related to the communication channel to a second external electronic device through the short range communication circuit,
 receive a request to transfer communication rights with the first external electronic device to the second external electronic device, from the first external electronic device or the second external electronic device, through the short range communication circuit, transfer, to the second external electronic device, communication rights for communicating the first external electronic device, and wherein, the request to transfer communication rights includes information for acquisition of an external audio signal by using the second external electronic device.

5. The electronic device of claim 4, wherein the request to transfer includes information related to a call received at the first external electronic device or information related to voice recognition of the second external electronic device.

6. The electronic device of claim 4, wherein transfer the communication rights to the second external electronic device comprises switching from a primary role to an observer role.

7. An electronic device comprising:
a microphone;
a short range communication circuit; and
a processor, wherein the processor is configured to:
receive, from a first external electronic device, through the short range communication circuit, information related to a communication channel connected using a designated communication scheme between the first external electronic device and a second external electronic device;
transmit a request, to the first external electronic device, for communication rights with the second external electronic device;
receive, from the first external electronic device, communication rights for communicating with the second external electronic device; and
acquire at least a part of an audio signal transmitted from the second external electronic device to the electronic device, through the short range communication circuit based on information related to the communication channel.

8. The electronic device of claim 7, wherein receive notification comprises:
receive notification of a call at the first external electronic device through the short range communication circuit; and
receive the communication rights of the first external electronic device, which is transferred from the first external electronic device, at least based on rights transfer information.

9. The electronic device of claim 7, wherein the processor is configured to transmit data received at the first external electronic device and an audio signal acquired through the microphone to the second external electronic device through the short range communication circuit.

10. An electronic device comprising:
a microphone;
a short range communication circuit; and
a processor, wherein the processor is configured to:
receive, from a first external electronic device, through the short range communication circuit, information related to a communication channel connected using a designated communication scheme between the first external electronic device and a second external electronic device;
receive communication rights transferred from the first external electronic device to communication with the second external electronic device;
acquire an audio signal from the microphone;

transmit the audio signal to the second external electronic device with the communication rights, through the short range communication circuit; and
request and acquire the communication rights of the first external electronic device from the first external electronic device when a request for using the microphone is confirmed.

11. An electronic device, comprising:
a short range communication circuit; and
a processor, wherein the processor is configured to:
establish a communication channel with a first external electronic device by using a designated communication scheme, through the short range communication circuit;
confirm, by the electronic device, a request for acquiring an audio signal by using a microphone functionally connected with a second external electronic device; and
at least based on the confirmed request, transmit by the electronic device, to the first external electronic device, an instruction to transfer communication rights of the first external electronic device to communicate with the electronic device to the second external electronic device that is functionally connected to the microphone acquiring the audio signal; and
receive a voice signal from the second external electronic device.

12. An operation method of an electronic device, comprising:
establishing a first communication channel with a first external electronic device by using a designated communication scheme;
transmitting information related to the first communication channel to a second external electronic device through a second communication channel established using the designated communication scheme with the second external electronic device;
reproducing an audio signal transmitted from the first external electronic device through the first communication channel;
detecting a trigger for transferring communication rights to the second external electronic device by the first external electronic device or the second external electronic device;
responsive to detecting the trigger, transferring by the electronic device the communication rights of the electronic device to the second external electronic device through the second communication channel; and
changing a mode of the electronic device in response to transferring of the communication rights.

13. The method of claim 12, wherein the detecting of the trigger comprises confirming a request for acquiring an external audio signal by the second external electronic device.

14. The method of claim 13, wherein the detecting of the trigger further comprises acquiring information related to a call of the first external electronic device or information related to voice recognition of the second external electronic device.

15. The method of claim 12, wherein the reproducing of the audio signal comprises transmitting a response signal related to whether the audio signal received from the first external electronic device is not received, to the first external electronic device through the first communication channel.

16. An electronic device comprising:
a short range communication circuit;
a microphone; and
a processor, wherein the processor is configured to:
receive, from a first external electronic device, information related to a communication channel connected using a designated communication scheme between the first external electronic device and a second external electronic device, through the short range communication circuit;
confirm reception of designated data from the first external electronic device; and
when reception of the designated data is confirmed, transmit the received designated data and audio data acquired through the microphone to the second external electronic device through the short range communication circuit.

17. The electronic device of claim 16, wherein the processor is configured to allow the electronic device to operate as a primary device, at least based on reception of the designated data from the first external electronic device.

18. The electronic device of claim 16, wherein the processor is configured to:
receive communication rights enabling communication with the second external electronic device, which is transferred from the first external electronic device, at least based on reception of the designated data; and
communicate with the second external electronic device by using the designated communication scheme at least based on receiving of the communication rights.

19. The electronic device of claim 16, wherein:
the designated data includes information related to a reception state of an audio signal received from the second external electronic device by the first external electronic device; and
the processor is configured to determine a response signal at least based on the information related to the reception state of the audio signal received from the first external electronic device and the reception state of the audio signal received from the second external electronic device by the electronic device, and transmit the determined response signal to the second external electronic device.

* * * * *